(12) United States Patent
Nakano et al.

(10) Patent No.: US 8,897,122 B2
(45) Date of Patent: Nov. 25, 2014

(54) COMMUNICATION SYSTEM, TRANSMITTER AND RECEIVER

(75) Inventors: Hiroshi Nakano, Osaka (JP); Takashi Onodera, Osaka (JP); Shimpei To, Osaka (JP); Kozue Hirata, Osaka (JP); Hiromichi Tomeba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 117 days.

(21) Appl. No.: 13/582,374

(22) PCT Filed: Jan. 31, 2011

(86) PCT No.: PCT/JP2011/051854
§ 371 (c)(1),
(2), (4) Date: Aug. 31, 2012

(87) PCT Pub. No.: WO2011/108319
PCT Pub. Date: Sep. 9, 2011

(65) Prior Publication Data
US 2013/0003641 A1    Jan. 3, 2013

(30) Foreign Application Priority Data
Mar. 1, 2010    (JP) ................. 2010-043830

(51) Int. Cl.
| | | |
|---|---|---|
| H04L 25/02 | (2006.01) |
| H04J 11/00 | (2006.01) |
| H04B 7/06 | (2006.01) |
| H04L 5/00 | (2006.01) |
| H04B 7/02 | (2006.01) |
| H04B 7/04 | (2006.01) |
| H04B 17/00 | (2006.01) |

(52) U.S. Cl.
CPC .......... *H04B 7/0452* (2013.01); *H04J 11/0033* (2013.01); *H04B 7/0658* (2013.01); *H04L 5/0051* (2013.01); *H04B 7/063* (2013.01); *H04B 7/0617* (2013.01); *H04B 7/024* (2013.01); *H04B 17/0067* (2013.01); *H04L 5/0007* (2013.01); *H04L 25/0224* (2013.01)
USPC ............................ 370/203; 370/208; 375/295

(58) Field of Classification Search
CPC .................. H04B 7/0452; H04L 2025/03006; H04L 2025/03426; H04L 2025/03783
USPC ........... 370/203, 208, 329, 330; 375/295, 296
See application file for complete search history.

(56) References Cited

U.S. PATENT DOCUMENTS

| | | |
|---|---|---|
| 2005/0254556 A1 | 11/2005 | Fujii et al. |
| 2005/0265470 A1 | 12/2005 | Kishigami et al. |

(Continued)

FOREIGN PATENT DOCUMENTS

| | | |
|---|---|---|
| JP | 2004-201296 A | 7/2004 |
| JP | 2005-328310 A | 11/2005 |

(Continued)

OTHER PUBLICATIONS

Harashima et al., "Matched-Transmission Technique for Channels With Intersymbol Interference", IEEE Transactions on Communications, vol. COM-20, No. 4, Aug. 1972, pp. 774-780.

(Continued)

*Primary Examiner* — Kerri Rose
(74) *Attorney, Agent, or Firm* — Birch, Stewart, Kolasch & Birch, LLP

(57) ABSTRACT

Disclosed is a transmission device including a plurality of antennas for transmitting signals in the same channel at the same time point to a plurality of reception devices, characterized by including: a DRS generator configured to generate DRSs (dedicated reference signals) for the respective reception devices; a nonlinear spatial multiplexer configured to generate a nonorthogonal DRS by use of a first group of DRSs including at least one of the DRSs; and a transmitter configured to transmit a signal containing at least the nonorthogonal DRS.

11 Claims, 24 Drawing Sheets

(56) References Cited

U.S. PATENT DOCUMENTS

| | | | |
|---|---|---|---|
| 2008/0063116 A1 | 3/2008 | Yokoyama | |
| 2010/0260288 A1 | 10/2010 | Aoki et al. | |
| 2011/0085503 A1* | 4/2011 | Nam et al. | 370/329 |
| 2011/0244816 A1 | 10/2011 | Mori et al. | |
| 2013/0021991 A1* | 1/2013 | Ko et al. | 370/329 |

FOREIGN PATENT DOCUMENTS

| | | |
|---|---|---|
| JP | 2009-182894 A | 8/2009 |
| JP | 2010-114605 A | 5/2010 |
| WO | WO 2006/103758 A1 | 10/2006 |
| WO | 2008/115588 A2 | 9/2008 |
| WO | 2009/096345 A2 | 8/2009 |

OTHER PUBLICATIONS

Liu et al., "Improved Tomlinson-Harashima Precoding for the Downlink of Multiple Antenna Multi-User Systems", IEEE Communications Society/ WCNC, 2005, pp. 466-472.

Stankovic et al., "Successive Optimization Tomlinson-Harashima Precoding (SO THP) for Multi-User MIMO Systems", IEEE, ICASSP, 2005, pp. 1117-1120.

* cited by examiner

FIG. 2
(a) Signle carrier
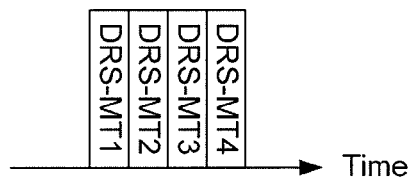
(b) Multi carrier
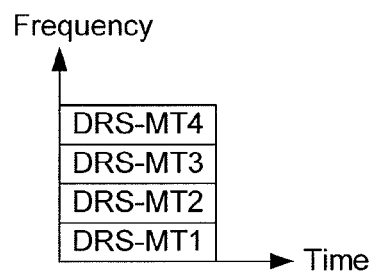
(c)
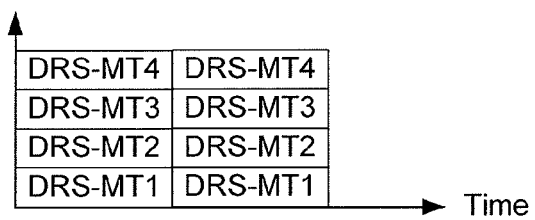
FIG. 3
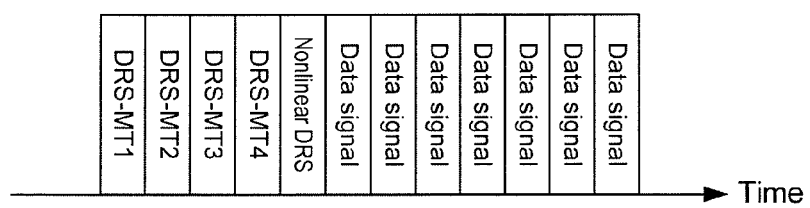

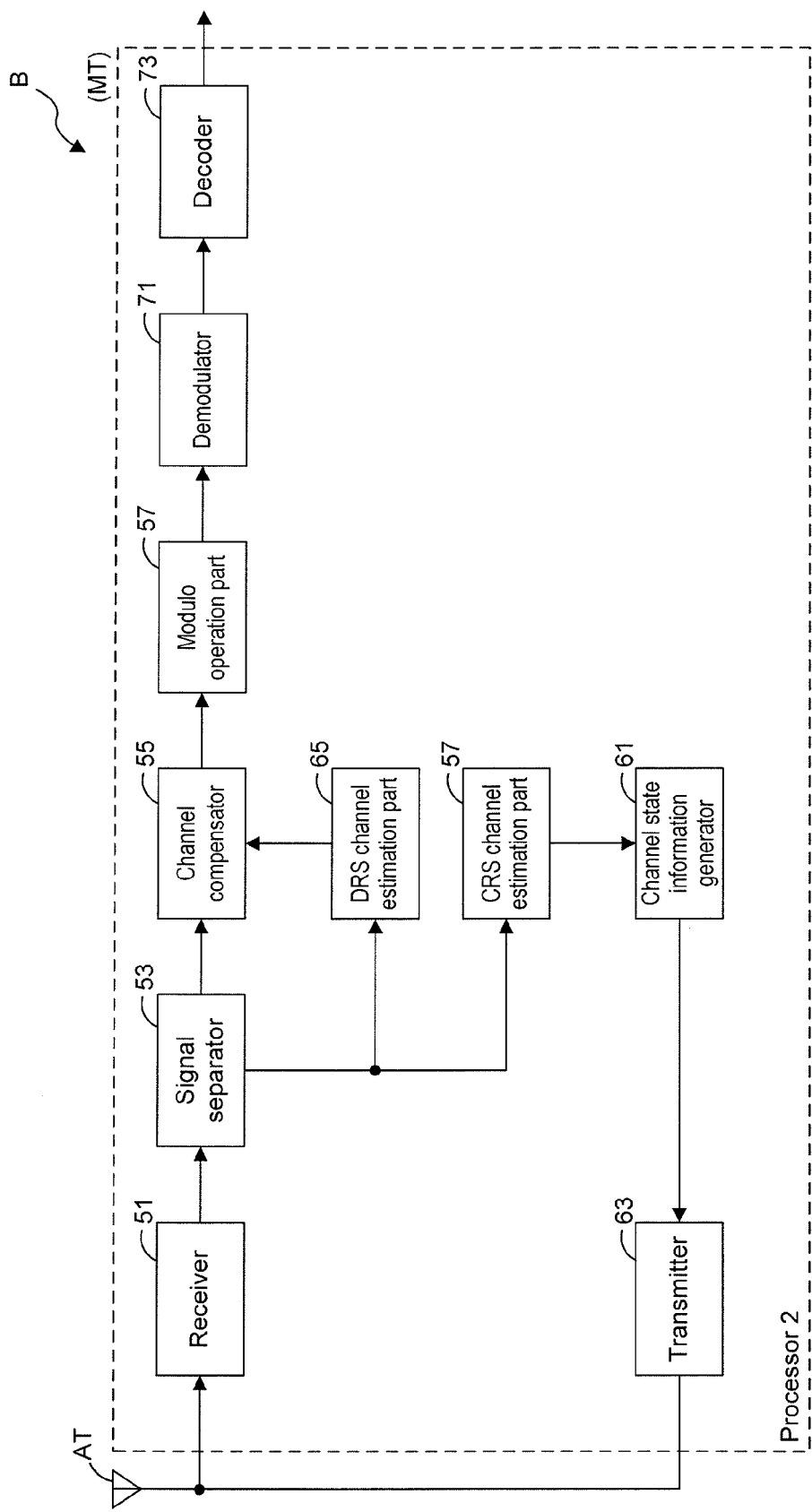

FIG. 4B
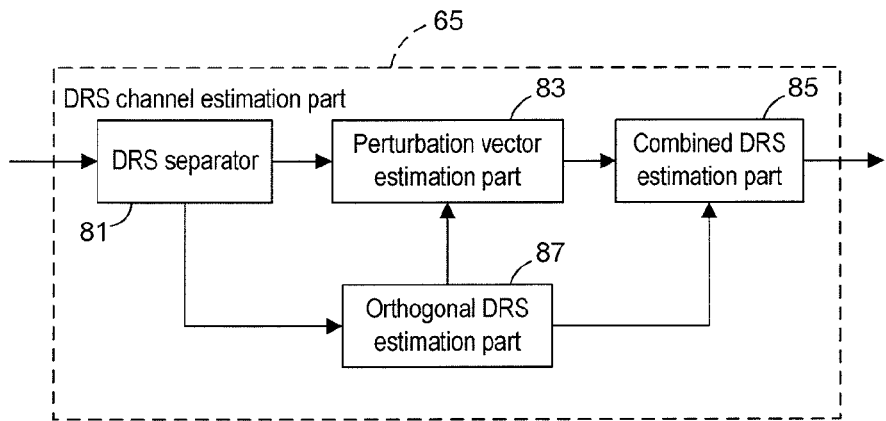
FIG. 5
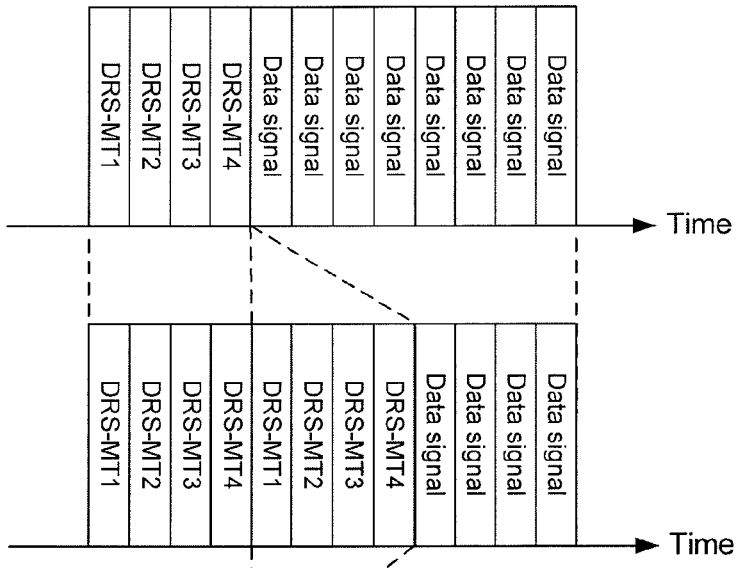
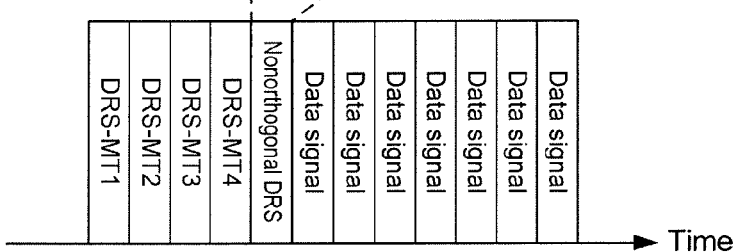

FIG. 6
(a) 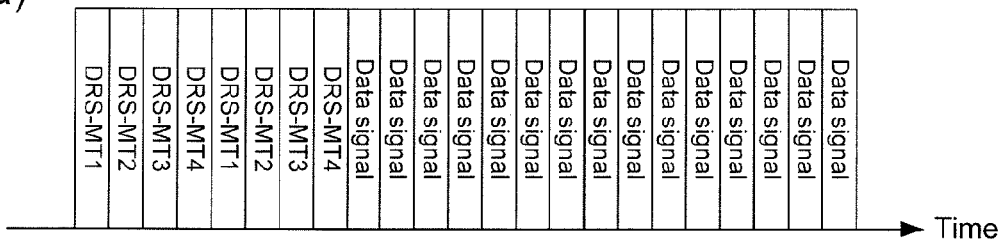
(b) 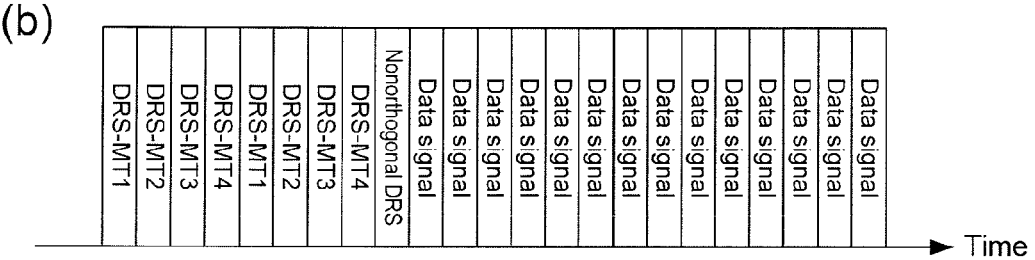
FIG. 7
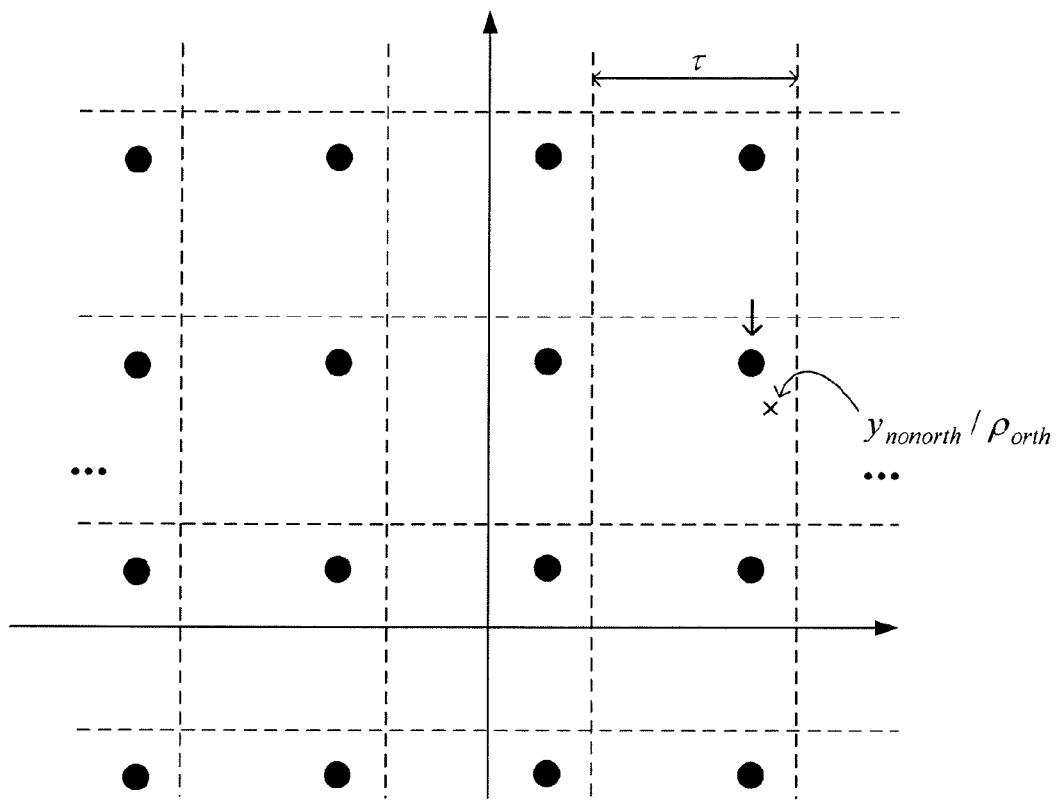

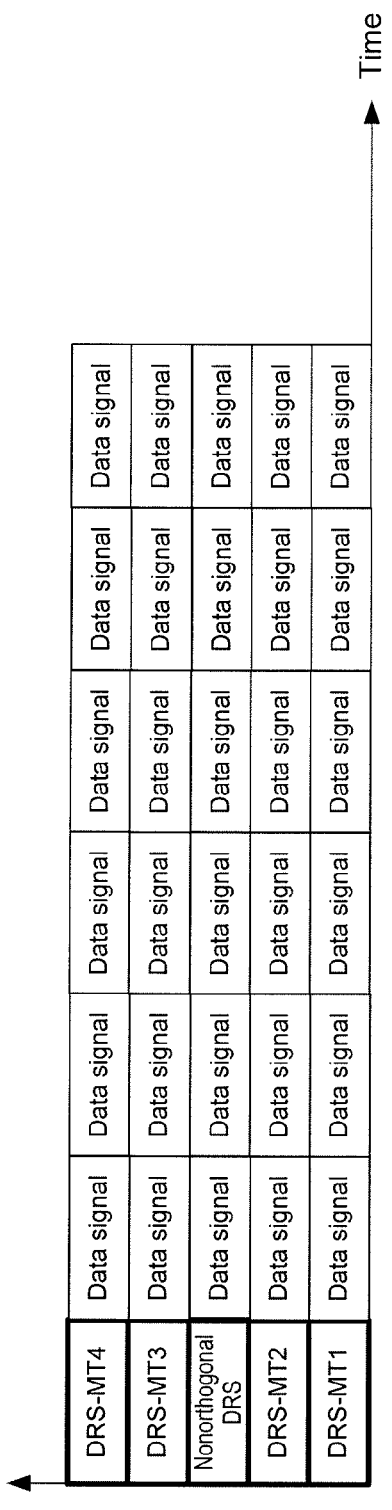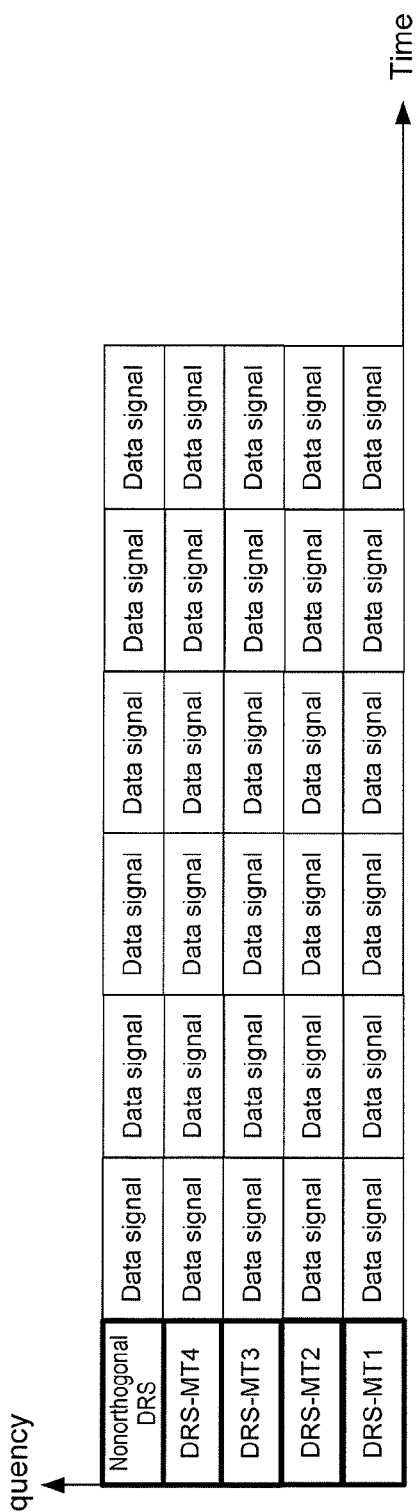
FIG. 16

$u_0 = [1, -1, -1, 1]$
$u_1 = [1, -1, 1, -1]$
$u_2 = [1, 1, -1, -1]$
$u_3 = [1, 1, 1, 1]$
$u_4 = [1, -1, -1, -1]$
$u_5 = [1, -j, 1, j]$
$u_6 = [1, 1, -1, 1]$
$u_7 = [1, j, 1, -j]$

COMMUNICATION SYSTEM, TRANSMITTER AND RECEIVER

TECHNICAL FIELD

The present invention relates to a mobile communication technique.

BACKGROUND ART

1. Regarding THP

Tomlinson Harashima Precoding (THP) is a technique in which under a situation where interference exists, a transmitter previously knows the interference, previously cancels the interference from a transmission signal and transmits the signal to a receiver. In this process, this method causes both the transmitter and the receiver to carry out a Modulo (remainder) operation to transmit and receive the signal in which an increase in transmission power due to the cancellation of the interference is suppressed (refer to later mentioned non-patent document 1).

A description will be given of the Modulo operation carried out by both the transmitter and the receiver in the communication using THP. The Modulo operation is a process of reducing transmission power by keeping the amplitude of a transmission signal within a certain range or less. To be specific, the Modulo operation is an operation in which both the transmission and reception sides add a signal being an integer multiple of a known value $\tau$ to an I-ch (In-phase channel) and a Q-ch (Qadrature channel) of the transmission signal by both the transmission and reception sides, and thereby convert the transmission signal into a signal within a range of $[-\tau/2, \tau/2]$. An example of the Modulo operation is shown in FIG. 24. In FIG. 24, the Modulo operation is shown as a process of shifting a signal represented as ● to a position of ○, and of shifting ● to ○ by adding a perturbation vector $d(=(-2)\tau+j*(-1)\tau)$ to ●. Here, j represents an imaginary unit. Both the I-ch and the Q-ch of ○ are within the range between the origin and $[-\tau/2, \tau/2]$. Thus, the Modulo operation is effective in keeping the amplitude of a signal within a certain range. Generally, if mean power of a modulation symbol is normalized to 1, a Modulo width $\tau$ is a certain value previously known by the transmission and reception sides, according to the modulation scheme. For example, $\tau=2\sqrt{2}$ in QPSK, $\tau=8/\sqrt{10}$ in 16QAM, and $\tau=16/\sqrt{42}$ in 64QAM.

This Modulo operation enables transmission of a signal in which the increase in transmission power due to removal of interference is suppressed, even in an environment where the reception side undergoes a large interference. The Modulo operation is expressed as:

[Formula 1]

$$\mathrm{Mod}_\tau(x) = x - \mathrm{floor}\left(\frac{\mathrm{Re}(x)+\frac{\tau}{2}}{\tau}\right)\tau - j\cdot \mathrm{floor}\left(\frac{\mathrm{Im}(x)+\frac{\tau}{2}}{\tau}\right)\tau. \quad (1)$$

Here, j represents an imaginary unit, Re(x) represents a real part of x, and Im(x) represents an imaginary part of x. In addition, floor(x) represents the largest integer below x.

Next, a principle of THP will be described. Assume that s is a desired signal and f is interference. The transmitter firstly subtracts interference f from desired signal s because THP is based on the assumption that interference f is previously known. However, since the signal s−f resulting from the subtraction normally has a large amplitude, transmission power will be increased if the signal is transmitted as it is. For this reason, the transmitter carries out the Modulo operation on the signal s−f and transmits the resultant signal expressed as $\mathrm{Mod}_\tau(s-f)$.

With this operation, the transmitter can keep the I-ch and the Q-ch of the transmission signal within the range between the origin and $[-\tau/2, \tau/2]$, and thereby transmit a signal with less power than the case of transmitting the signal s−f. Here, assuming that a characteristic of a channel is 1 and ignoring the influence of noise, a reception signal is expressed as $\mathrm{Mod}_\tau(s-f)+f$ because the receiver undergoes interference f. By carrying out the Modulo operation on this reception signal, the receiver can detect the desired signal as in the following formula:

[Formula 2]

$$\mathrm{Mod}_\tau(\mathrm{Mod}_\tau(s-f)+f)=\mathrm{Mod}_\tau(s-f+f)=\mathrm{Mod}_\tau(s)=s \quad (2)$$

By thus carrying out the Modulo operation on the reception side as well, the desired signal s can be reconstructed on the reception side. The above is the mechanism of THP.

2. MU-MIMO THP (Overall System Configuration)

As shown in FIG. 25, when a base station (BS) transmits signals to multiple mobile terminals (MTs) at the same time point at the same frequency, a multi-user interference (MUI) occurs usually. Downlink (DL) MU-MIMO (Multi-User Multi Input Multi Output) is a method of using THP to cancel the MUI with high power efficiency, and multiplexing multiple MTs.

DL MU-MIMO THP is a technique based on the premise that the BS knows all channel state information (CSI) of the MTs. This is because THP requires, as described above, that the BS being the transmitter know the interference that the MT being the receiver undergoes, and DL MU-MIMO THP requires that the CSI be used to calculate the interference.

Hereinbelow, a description will be given of configurations of a BS and MT in the DL MU-MIMO THP with reference to the drawings. Although a case of two MTs is used herein to simplify the description, a case of multiplexing any number of MTs by MU-MIMO THP can be implemented likewise (refer to later mentioned non-patent document 2).

(BS Configuration (2MTs))

The BS knows CSI for each of the MTs, and simultaneously transmits signals to two MTs at the same time point at the same frequency. At this time, as shown in FIG. 25, in order to prevent the two MTs (MT1, MT2) from interfering with each other, two types of interference affecting each other including interference by signals for MT1 interfering with MT2, and interference by signals for MT2 interfering with MT1 need to be cancelled. The BS cancels one of the two types of interference by THP, and cancels the other by multiplying the interference by a linear filter. FIG. 26 shows a concrete configuration example of a BS for achieving communication with the two MTs. Hereinafter, a description will be given of a configuration of the BS according to the exemplar configuration shown in FIG. 26.

(Configuration of BS)

First of all, encoders 101-1, 2 convert information bits for the respective MTs into error correcting codes, and input the coded bits for the respective MTs to modulators 103-1, 2. The modulators 103-1, 2 modulate the coded bits for the respective MTs inputted thereto, and generate modulated signals for the respective MTs. After generating the modulated signal for MT1, the modulator 103-1 inputs a modulation symbol for MT1 to an interference calculator 113 and to a linear filter multiplier 115. After generating the modulated signal for MT2, the modulator 103-2 inputs a modulation symbol for MT2 to an interference subtractor 107.

A linear filter calculator 117 calculates a linear filter and interference coefficient information by use of CSI known to the BS, and inputs them to the linear filter multiplier 115 and the interference calculator 113, respectively. Then, the interference calculator 113 calculates the interference that MT2 undergoes, by use of the interference coefficient information as well as the modulated signal inputted from the modulator 103-1 having generated the modulated signal for MT1, and inputs the interference to the interference subtractor 107. The interference subtractor 107 subtracts the interference that MT2 undergoes from the modulated signal for MT2, and then inputs the signal after the subtraction to a Modulo operation part 111. The Modulo operation part 111 carries out the Modulo operation shown in formula (1) on the signal after the subtraction, and inputs the signal after the Modulo operation to the linear filter multiplier 115. In FIG. 26, the interference subtractor 107, the interference calculator 113 and the Modulo operation part 111 surrounded with a broken line are referred to as a nonlinear spatial multiplexer 105.

The linear filter multiplier 115 multiplies each of the inputted signal for MT1 and signal for MT2 by a linear filter. With this operation, a Null of the signal for MT2 is directed toward MT1, so that MT1 can be free from the interference of the signal for MT2.

Thereafter, the linear filter multiplier 115 inputs the signals after the linear filter multiplication to transmitters 121-1, 2. The transmitters 121-1, 2 perform digital-to-analog conversion on the signals after the linear filter multiplication, upconvert the signals to a carrier frequency and transmit the resultant signals to MT1 and MT2, respectively.

(MT Configuration (2MTs))

MT1 and MT2 receive signals transmitted from the BS. Each MT performs reception processing on the reception signal by carrying out the same Modulo operation as the BS. The MT will be described in detail with reference to FIG. 27.

(Configuration of MT)

A receiver 131 downconverts a signal received by an antenna AT from the carrier frequency to baseband and performs analog-to-digital conversion on the signal to generate a baseband digital signal. Then, the receiver 131 inputs the baseband digital signal to a channel compensator 133. The channel compensator 133 performs channel compensation on the baseband digital signal, and inputs the signal after the channel compensation to a Modulo operation part 135. The Modulo operation part 135 carries out the Modulo operation shown in formula (1) on the signal after the channel compensation, and inputs the signal after the Modulo operation to the demodulator. The demodulator 137 demodulates the signal after the Modulo operation and inputs the demodulation result to a decoder 141.

(Explanation of Theory)

As has been described with reference to FIG. 26 and FIG. 27, the mechanism of DL MU-MIMO THP includes: using THP to remove one of two types of interference caused by signals for MT1 and MT2 interfering with each other, and removing the other by multiplying the interference by a linear filter. Hereinafter, this mechanism of DL MU-MIMO THP will be described in detail from a theoretical aspect.

(Definition of Variable)

Assume that $h_{11}$, $h_{12}$ represent complex gain of channels from two antennas of the BS to MT1. Similarly assume that $h_{21}$, $h_{22}$ represent complex gain of channels to MT2. Using these values, a channel matrix H is expressed as:

[Formula 3]

$$H = \begin{pmatrix} h_{11} & h_{12} \\ h_{21} & h_{22} \end{pmatrix}. \quad (3)$$

In addition, assume that $s_1$ and $s_2$ are modulated signals for MT1 and MT2, respectively.

(Linear Filter Calculation)

The linear filter calculator 115 uses a linear filter to direct a null of a signal for MT2 toward MT1, thereby to cancel interference by signals for MT2 interfering with MT1. The linear filter calculator 115 obtains this linear filter by performing QR decomposition on the Hermitian conjugate $H^H$ of the channel matrix H. QR decomposition is a method of decomposing a given matrix into a product of a unitary matrix Q and an upper triangular matrix R, and $H^H$ after the QR decomposition is expressed as:

[Formula 4]

$$H^H = QR \quad (4).$$

Here, each of Q and R is a matrix including two rows and two columns, and R is an upper triangular matrix in which a component of second row first column is 0. The linear filter to be used in the multiplication by the linear filter calculator 115 is the unitary matrix Q of formula (4). When HQ of a combination of the linear filter Q and the actual channel matrix H is considered as an equivalent channel, HQ is expressed as:

[Formula 5]

$$HQ = (QR)^H Q = (R^H Q^H) Q = R^H \quad (5).$$

As R is an upper triangular matrix, $R^H$ is a lower triangular matrix. Specifically, a component of first row second column of the equivalent channel $R^H$ is 0. Assuming that noise is 0, respective reception signals $y_1$, $y_2$ of MT1 and MT2 can be calculated as:

[Formula 6]

$$\begin{pmatrix} y_1 \\ y_2 \end{pmatrix} = R^H \begin{pmatrix} s_1 \\ s_2 \end{pmatrix} = \begin{pmatrix} r^*_{11} & 0 \\ r^*_{12} & r^*_{22} \end{pmatrix} \begin{pmatrix} s_1 \\ s_2 \end{pmatrix} = \begin{pmatrix} r^*_{11} s_1 \\ r^*_{12} s_1 + r^*_{22} s_2 \end{pmatrix}. \quad (6)$$

Here, a component of row k column l of R is expressed as $r_{kl}$. In addition, * indicates a complex conjugate. It can be seen from formula (6) that $y_1$ does not include an $s_2$ component. To be specific, the BS multiplies signals for MTs by the linear filter Q to prevent signals for MT2 from reaching MT1. In other words, The BS directs the null of the signal for MT2 toward MT1.

(Interference Calculation)

Having cancelled the interference by signals for MT2 interfering with MT1 by use of the linear filter, interference by signals for MT1 interfering with MT2 will next be cancelled by use of afore-mentioned THP.

As shown in formula (2), firstly, interference f needs to be calculated in order for the BS to perform THP. In this case, the value is found by assuming that f is interference after MT2 has performed channel compensation. According to formula (6), a reception signal $z_2$ having undergone the channel compensation by MT2 is expressed as:

[Formula 7]

$$z_2 = 1/r^*_{22} \cdot y_2 = 1/r^*_{22} \cdot (r^*_{12} s_1 + r^*_{22} s_2) = s_2 + r^*_{12}/r^*_{22} \cdot s_1 \quad (7)$$

Since the interference component f indicates terms other than a signal $s_2$ for MT2, the interference is expressed as:

[Formula 8]

$$f = r^*_{12}/r^*_{22} \cdot s_1 \quad (8)$$

Here, f is obtained by multiplying a signal $s_1$ for MT1 by coefficient $r^*_{12}/r^*_{22}$. This coefficient $r^*_{12}/r^*_{22}$ represents the interference coefficient information. The linear filter multiplier calculates the interference coefficient information and inputs the result to the interference calculator, and then the interference calculator calculates the interference f shown in formula (8) with the coefficient $r^*_{12}/r^*_{22}$ and the modulated signal $s_1$ for MT1.

(THP)

The BS calculates a signal $\text{Mod}_f(s_2-f)$ by use of the interference f and the modulated signal $s_2$ for MT2 in the interference subtractor 107 and the Modulo operation part 111, and inputs the signal to the linear filter multiplier 115. The linear filter multiplier 115 multiplies each of the signal $\text{Mod}_f(s_2-f)$ and the signal $s_1$ for MT1 by the linear filter Q and calculates a transmission signal. In this configuration, the interference subtractor 107, the interference calculator 113 and the Modulo operation part 111 shown in FIG. 26 are referred to as the nonlinear spatial multiplexer 105. In addition, the process of calculating the signal to be inputted to the linear filter multiplier 115 by carrying out the interference cancellation and the Modulo operation on the modulated signal is referred to as nonlinear-spatial multiplexing.

(Reception Signal)

Replacing $s_2$ with $\text{Mod}_f(s_2-f)$ in formula (6), the reception signal is found as:

[Formula 9]

$$\begin{pmatrix} y_1 \\ y_2 \end{pmatrix} = HQ \begin{pmatrix} s_1 \\ \text{Mod}(s_2 - f) \end{pmatrix} = R^H \begin{pmatrix} s_1 \\ \text{Mod}(s_2 - f) \end{pmatrix} \quad (9)$$
$$= \begin{pmatrix} r^*_{11} s_1 \\ r^*_{12} s_1 + r^*_{22} \cdot \text{Mod}(s_2 - f) \end{pmatrix}.$$

Here, MT2 carries out the Modulo operation after the channel compensation of the reception signal $y_2$. Then, as shown in

[Formula 10]

$$\text{Mod}(1/r^*_{22} \cdot y_2) = \text{Mod}(r^*_{12}/r^*_{22} s_1 + \text{Mod}(s_2 - r^*_{12}/r^*_{22} s_1)) \quad (10)$$
$$= \text{Mod}(r^*_{12}/r^*_{22} s_1 + (s_2 - r^*_{12}/r^*_{22} s_1))$$
$$= s_2,$$

MT2 is able to detect the modulated signal $s_2$ directed thereto. By similarly carrying out the Modulo operation after channel compensation, the modulated signal for MT1 can also be found.

[Formula 11]

$$\text{Mod}(1/r^*_{11} \cdot y_1) = \text{Mod}(r^*_{11}/r^*_{11} s_1) = \text{Mod}(s_1) = s_1. \quad (11)$$

As described above, both MT1 and MT2 are able to detect the signals directed to themselves.

3. Multistream Communication with MTs Having Multiple Reception Antennas

The above description has been given of a method of transmitting a single datastream at a time to different MTs. Meanwhile, as shown in FIG. 28, there is also a technique of using MU-MIMO THP to spatially multiplex MTs at the same time point at the same frequency, the MTs each having multiple reception antennas and performing multi-datastream communication by SU-MIMO (refer to non-patent document 3). With this technique, spatial resource can be used efficiently for MTs having multiple reception antennas as well. Hence, even when multi-stream communication is performed, the BS transmits a datastream for each MT after carrying out a Modulo operation thereon.

4. Regarding DRS

In DL MU-MIMO THP, dedicated reference signals (DRSs) for respective MTs used for demodulation are transmitted not by spatial multiplexing but by a multiplexing method in which the DRSs for MTs are divided and allocated to orthogonal radio resources (such as time-division multiplexing and frequency-division multiplexing) (refer to patent document 1). Hereinafter, each of the DRSs for MTs divided and allocated to orthogonal radio resources is referred to as an "orthogonal DRS." The orthogonal DRS is used because: if the BS transmits the DRS by spatial multiplexing using MU-MIMO THP like in transmitting a data signal configured of a signal of modified information bits and the like, the MT cannot carry out a Modulo operation on the DRS since the amplitude of the signal is unknown, and cannot perform channel estimation based on the transmitted DRS after the Modulo operation.

In the case of transmitting the DRS to each MT with an orthogonal radio resource, the BS transmits the DRS previously known to both the BS and the MT (represented as a complex number q on a signal plane). At this time, the BS transmits the DRS to only one MT with a single orthogonal radio resource, and does not transmit signals to other MTs. Accordingly, the MT can receive the DRS transmitted from the BS without being affected by interference, and can divide a reception signal point y of the DRS by q to obtain a channel h=y/q.

On the other hand, if the BS simultaneously transmits the DRSs to multiple MTs by spatial multiplexing using THP as in the case of transmitting a data signal, the MT cannot perform channel estimation. This is because the BS transmits the DRS after carrying out a Modulo operation thereon, and thus the signal to which the MT should refer is not q but the signal q with a perturbation vector d added thereto by the Modulo operation. Specifically, the reference signal is a point represented by q+d, and although the MT should divide the reception signal point y by q+d, the MT is unable to know the value of d in advance. Hence, the MT cannot estimate the value of channel h.

For this reason, DL MU-MIMO THP uses the orthogonal DRS instead of the method of spatially multiplexing the DRSs for the MTs (refer to later mentioned patent document 1).

PRIOR ART DOCUMENT

Patent Document

Patent Document 1: Japanese patent application publication No. 2009-182894

Non-Patent Document

Non-Patent Document 1: H. Harashima and H. Miyakawa, "Matched-Transmission Technique for Channels With Intersymbol Interference," IEEE Transactions On Communications, Vol. Com-20, No. 4, pp. 774-780, August 1972.

Non-Patent Document 2: J. Liu and A Krzymien, "Improved Tomlinson-Harashima Precoding for the Downlink of Multiple Antenna Multi-User Systems," Proc. IEEE Wireless and Communications and Networking Conference, pp. 466-472, March 2005.

Non-Patent Document 3: V Stankovic and M. Haardt, "Successive optimization Tomlinson-Harashima precoding (SO THP) for multi-user MIMO systems," Proc. IEEE Int. Conf. Acoust., Speech, and Signal Processing (ICASSP), Vol. III, pp. 1117-1120, Philadelphia, Pa., USA, March 2005.

SUMMARY OF THE INVENTION

Problem to be Solved by the Invention

Orthogonal DRSs are time-division multiplexed for the number of spatially-multiplexed MTs, and spatially-multiplexed data signals are transmitted with the remaining symbols. For example, the orthogonal DRSs need to be time-multiplexed such as DRS-MT1, DRS-MT2, . . . , DRS-MT4 in part (a) of FIG. 29.

Meanwhile, to correctly demodulate or decode a data signal, the accuracy of channel estimation needs to be improved. Hence ideally, the BS should transmit the DRSs to the respective MTs multiple times, and the MTs should combine the multiple DRSs.

However, multiple transmissions of the orthogonal DRS increases overhead of control information. For example, as shown in part (b) of FIG. 29, the number of symbols used for transmission of the orthogonal DRS increases, whereby data transmission rate is largely degraded. The configurations of part (a) of FIG. 29 and part (b) of FIG. 29 are one example, as a matter of course, and this problem is common to general communication systems using spatial multiplexing by DL MU-MIMO THP.

Hence, an object of the present invention is to provide a method for improving channel estimation accuracy while minimizing degradation of data transmission rate in a communication system using spatial multiplexing by MU-MIMO THP.

Means for Solving the Problem

In addition to the demodulation pilot using time multiplexing and the like described in Japanese Patent Application Publication No. 2009-182894, a demodulation pilot spatially multiplexed by the principle of DL MU-MIMO as in the case of data is transmitted. Each MT uses both of a demodulation pilot transmitted by an orthogonal radio resource and a spatially-multiplexed pilot to combine the two pilots in a predetermined method and perform channel estimation.

A first aspect of the present invention provides a transmission device including a plurality of antennas for transmitting signals in the same channel at the same time point to a plurality of reception devices, the transmission device characterized by including: a DRS generator configured to generate DRSs (dedicated reference signals) for the respective reception devices; a nonlinear spatial multiplexer configured to generate a nonorthogonal DRS by use of a first group of DRSs including at least one of the DRSs; and a transmitter configured to transmit a signal containing at least the nonorthogonal DRS. In addition, the transmission device is characterized by further including an orthogonal multiplexer configured to generate an orthogonal DRS using a second group of DRSs including at least one of the DRSs, and is characterized in that the transmitter transmits a signal containing at least one of the nonorthogoal DRSs and at least one of the orthogonal DRSs.

Moreover, preferably, the transmission device may include a data signal generator configured to generate data signals for the reception devices, the nonlinear spatial multiplexer may perform nonlinear spatial multiplexing on the data signals, and the transmitter may transmit the data signals after the nonlinear spatial multiplexing to the plurality of reception devices.

In addition, the transmission device is characterized by including a linear filter calculator configured to calculate a linear filter and interference coefficient information according to channel state information, and is characterized in that the nonlinear spatial multiplexer includes: an interference calculator configured to calculate interference that each of the reception devices undergoes by use of the data signal or some of the DRSs of the first group; an interference subtractor configured to subtract the interference from each of the data signals for each of the reception devices or from the DRSs of the first group, and a Modulo operation part configured to carry out a Modulo operation on at least one of the data signals after the subtraction of the interference by the interference subtractor or at least one of the DRSs of the first group after the subtraction of the interference by the interference subtractor.

A reception device may be provided which includes a receiver configured to receive a nonorthogonal DRS in which a plurality of DRSs for respective reception devices are spatially multiplexed; and a channel estimation part configured to perform channel estimation by use of at least the nonorthogonal DRS.

Preferably, the receiver further receives an orthogonal DRS, and the channel estimation part comprises a channel estimator configured to perform channel estimation by use of at least the orthogonal DRS and the nonorthogonal DRS. Preferably, the channel estimation part includes an orthogonal DRS estimator configured to perform first channel estimation by use of the orthogonal DRS, and a perturbation vector estimator configured to estimate, by use of a result of the first channel estimation and the nonorthogonal DRS, a perturbation vector added to the nonorthogonal DRS. Preferably, the channel estimation part includes a combined DRS estimator configured to calculate a channel estimation value by use of the nonorthogonal DRS, the perturbation vector and the orthogonal DRS.

Preferably, the receiver receives an orthogonal DRS and a plurality of nonorthogonal DRSs; and the channel estimation part includes an orthogonal DRS estimator configured to calculate a channel estimation value by use of the orthogonal DRS, a perturbation vector estimator configured to estimate perturbation vectors added to some of the plurality of nonorthogonal DRSs by use of the channel estimation value and the some of the nonorthogonal DRSs, and a combined DRS estimator configured to calculate a channel estimation value by use of the some of the nonorthogonal DRSs, the perturbation vector and the orthogonal DRS.

Preferably, the perturbation vector estimator estimates a perturbation vector added to a nonorthogonal DRS other than the some of the nonorthogonal DRSs, by use of the channel estimation value and the nonorthogonal DRS other than the some of the nonorthogonal DRSs.

The present invention maybe a communication system including a plurality of reception devices and a transmission device configured to transmit signals in the same channel at the same time point to the plurality of reception devices through a plurality of transmission antennas, the system characterized in that: the transmission device includes a DRS generator configured to generate DRSs (dedicated reference signals) for the respective reception devices, a nonlinear spatial multiplexer configured to generate a nonorthogonal DRS by use of a first group of DRSs including at least one of the DRSs, and a transmitter configured to transmit a signal containing at least the nonorthogonal DRS, and the reception devices each include a receiver configured to receive a nonorthogonal DRS in which a plurality of DRSs for the respective reception devices are spatially multiplexed, and a channel estimation part configured to perform channel estimation by use of at least the nonorthogonal DRS.

The present invention a method for transmitting signals in the same channel at the same time point to a plurality of reception devices through a plurality of transmission antennas, the method including the steps of: generating DRSs (dedicated reference signals) for the respective reception devices; generating a nonorthogonal DRS by use of a first group of DRS including at least one of the DRSs; and transmitting a signal containing at least the nonorthogonal DRS.

The present invention may be a reception method characterized by including the steps of: receiving an orthogonal DRS and a nonorthogonal DRS; calculating a channel estimation value by use of the orthogonal DRS; and performing channel estimation by use of the channel estimation value and the nonorthogonal DRS.

The present invention may be a program for causing a computer to execute the method described above, or may be a recording medium for recording the program. The program may be acquired by a transmission medium such as the Internet.

The present invention may be a processor used in a transmission device including a plurality of antennas for transmitting signals in the same channel at the same time point to a plurality of reception devices, the processor characterized by including: a DRS generator configured to generate DRSs (dedicated reference signals) for the respective reception devices; a nonlinear spatial multiplexer configured to generate a nonorthogonal DRS by use of a first group of DRSs including at least one of the DRSs; and a transmitter configured to transmit a signal containing at least the nonorthogonal DRS.

The present invention may be a processor used in a reception device characterized by including: a receiver configured to receive a nonorthogonal DRS in which a plurality of DRSs for respective reception devices are spatially multiplexed; and a channel estimation part configured to perform channel estimation by use of at least the nonorthogonal DRS.

The description herein includes the contents of the description and/or the drawings provided in Japanese Patent Application Publication No. 2010-043830, which is the basis of priority of the present application.

Effects of the Invention

With a spatially-multiplexed nonorthogonal DRS, pilots can be transmitted to all MTs with a single radio resource, and thus enough radio resource for allocating data signals can be ensured. In addition, accuracy of channel estimation can be improved by transmitting the nonorthogonal DRS and the orthogonal DRSs.

BRIEF DESCRIPTION OF THE DRAWINGS

FIG. 2 is a diagram in which orthogonal DRSs for MTs are shown as DRS-MT1, DRS-MT2 and so on.

FIG. 3 is a diagram showing a frame configuration of a signal in a case of configuring a dedicated signal with data signals, a nonorthogonal DRS and orthogonal DRSs when the number of MTs is 4, for example.

FIG. 4A is a functional block diagram showing an exemplar configuration of an MT in the first embodiment of the present invention.

FIG. 4B is a diagram showing an exemplar configuration of a DRS channel estimation part.

FIG. 5 is a diagram showing exemplar frame configurations in cases of transmitting DRSs for MTs by time-division multiplexing.

Part (a) of FIG. 6 shows an exemplar configuration in a case of transmitting orthogonal DRSs multiple times in a frame, and part (b) of FIG. 6 shows an exemplar configuration to which a nonorthogonal DRS is added.

FIG. 7 is a diagram showing a concrete estimation method for a perturbation vector estimation part to estimate a sum q+d of a reference signal and a perturbation vector, by use of $\rho_{orth}$ and a nonorthogonal DRS $y_{nonorth}$ received by an MT.

Figure 8:
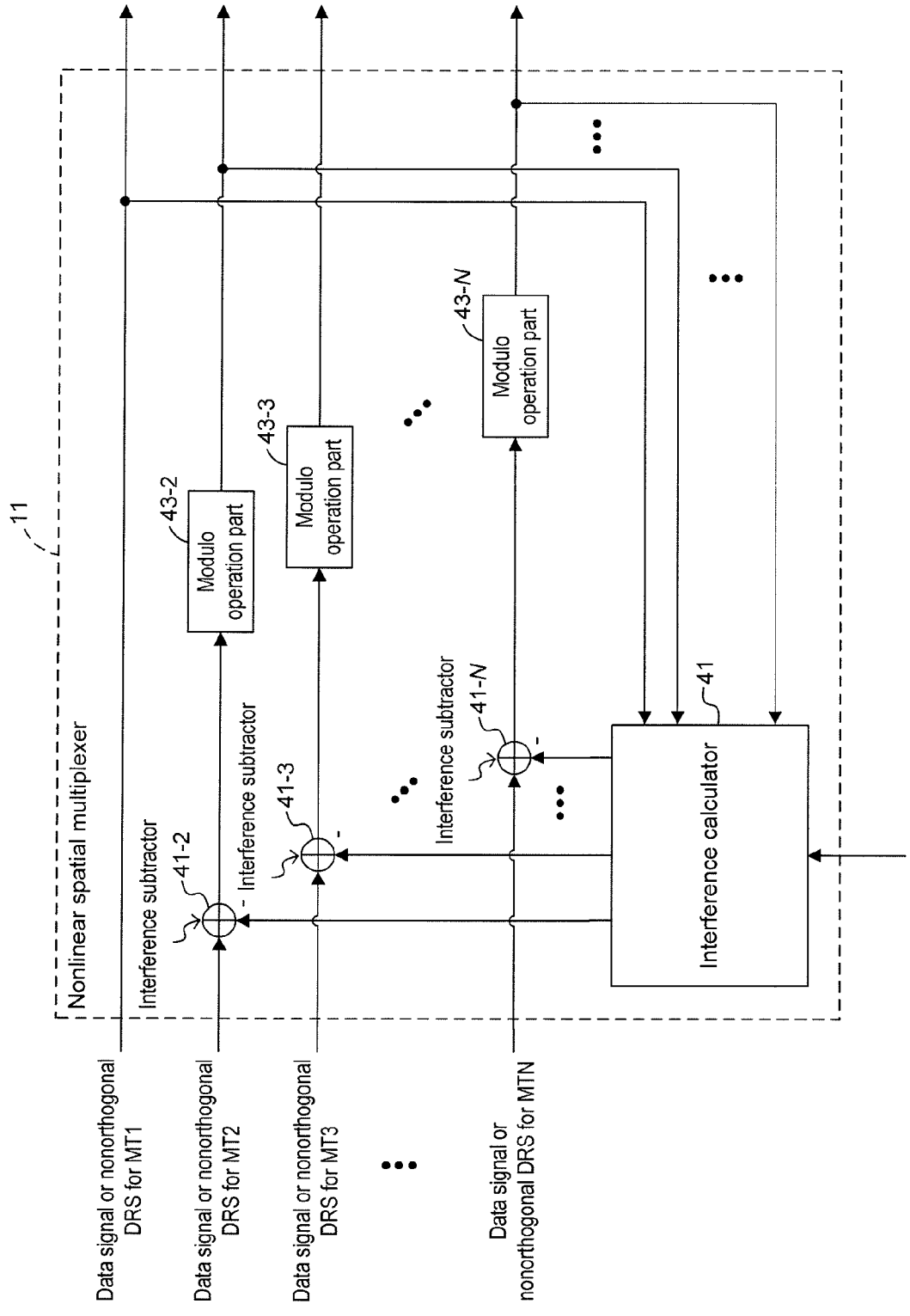

FIG. 8 is a functional block diagram showing an exemplar configuration of a nonlinear spatial multiplexer.

Figure 9:
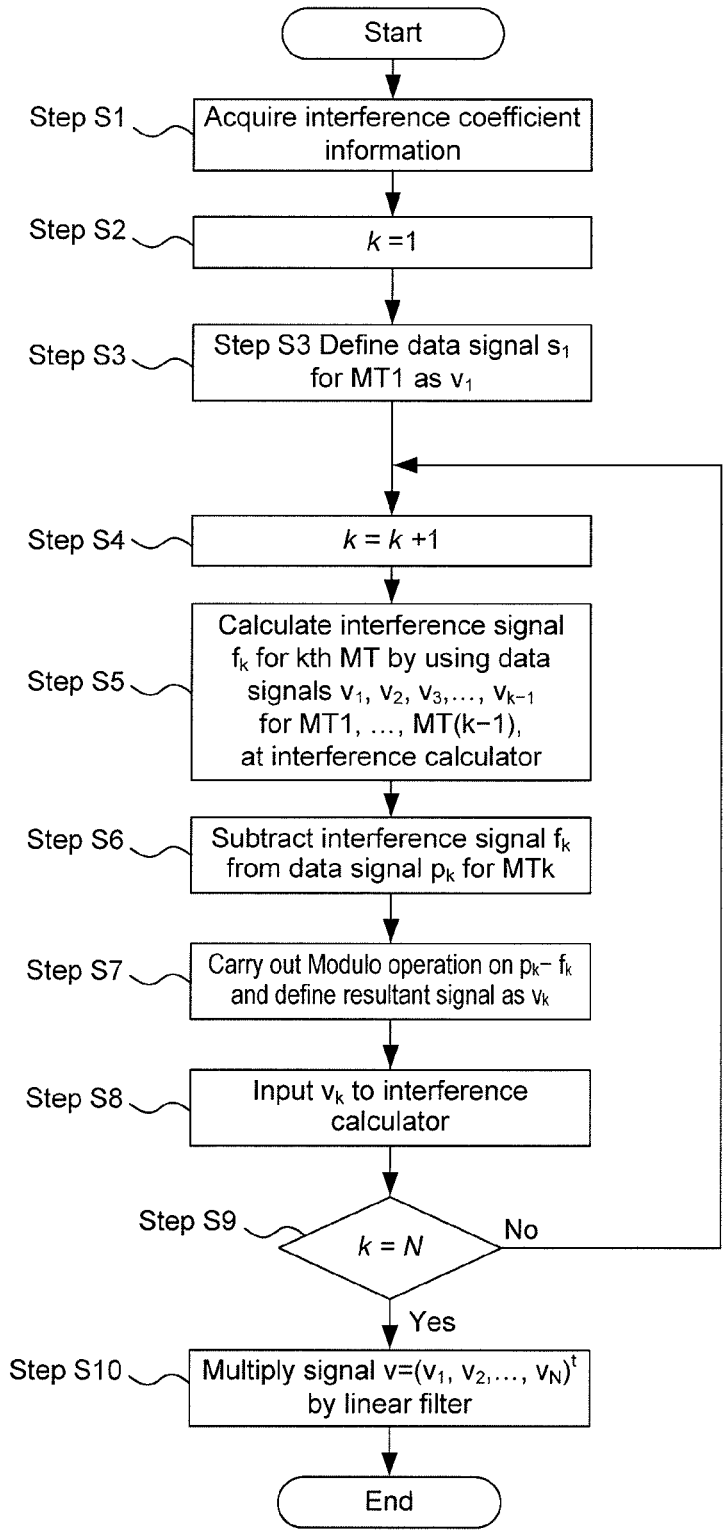

FIG. 9 is a flowchart showing a flow of an operation of the nonlinear spatial multiplexer.

Figure 10:
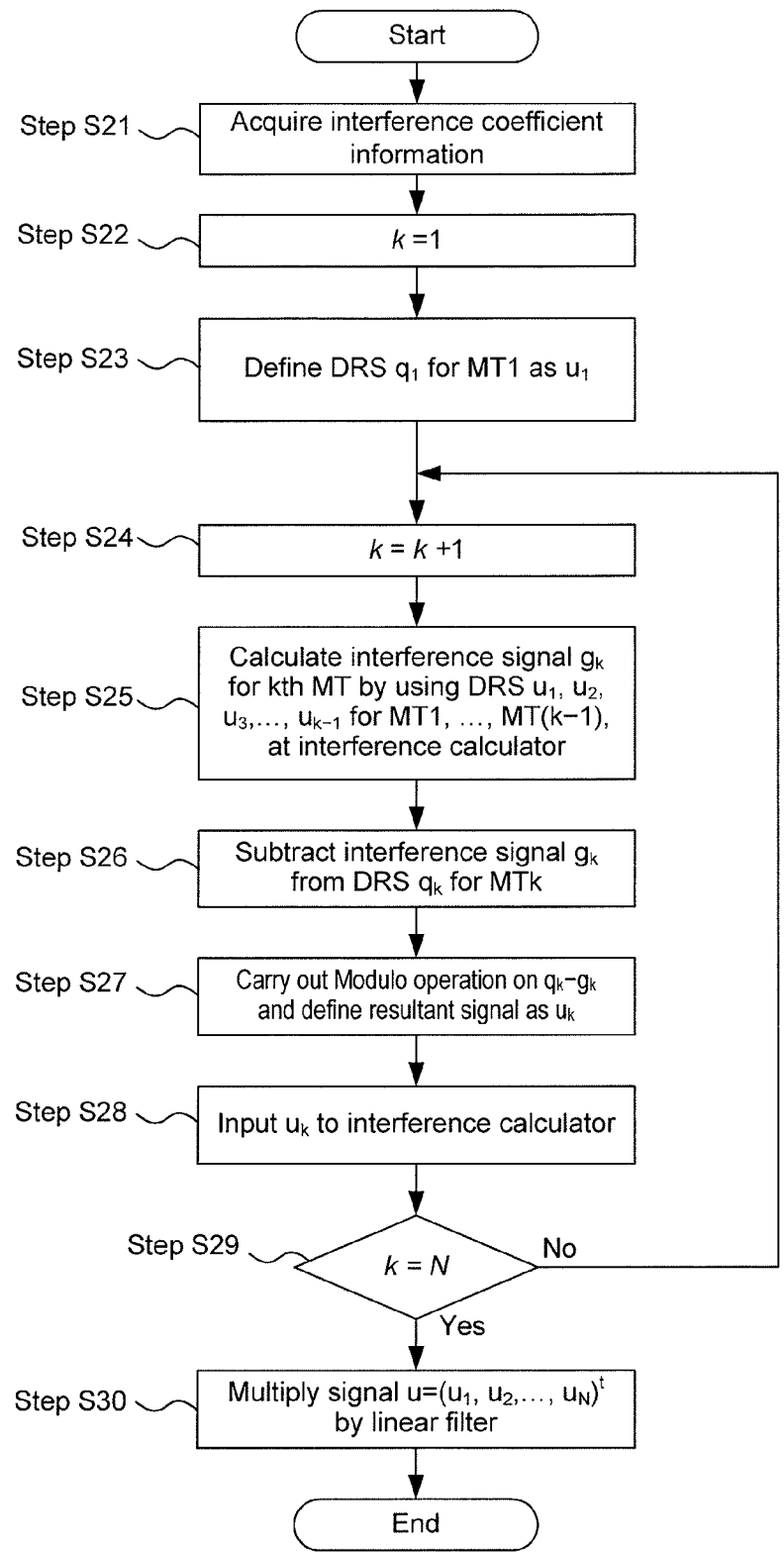

FIG. 10 is another flowchart showing a flow of an operation of the nonlinear spatial multiplexer.

Figure 1:
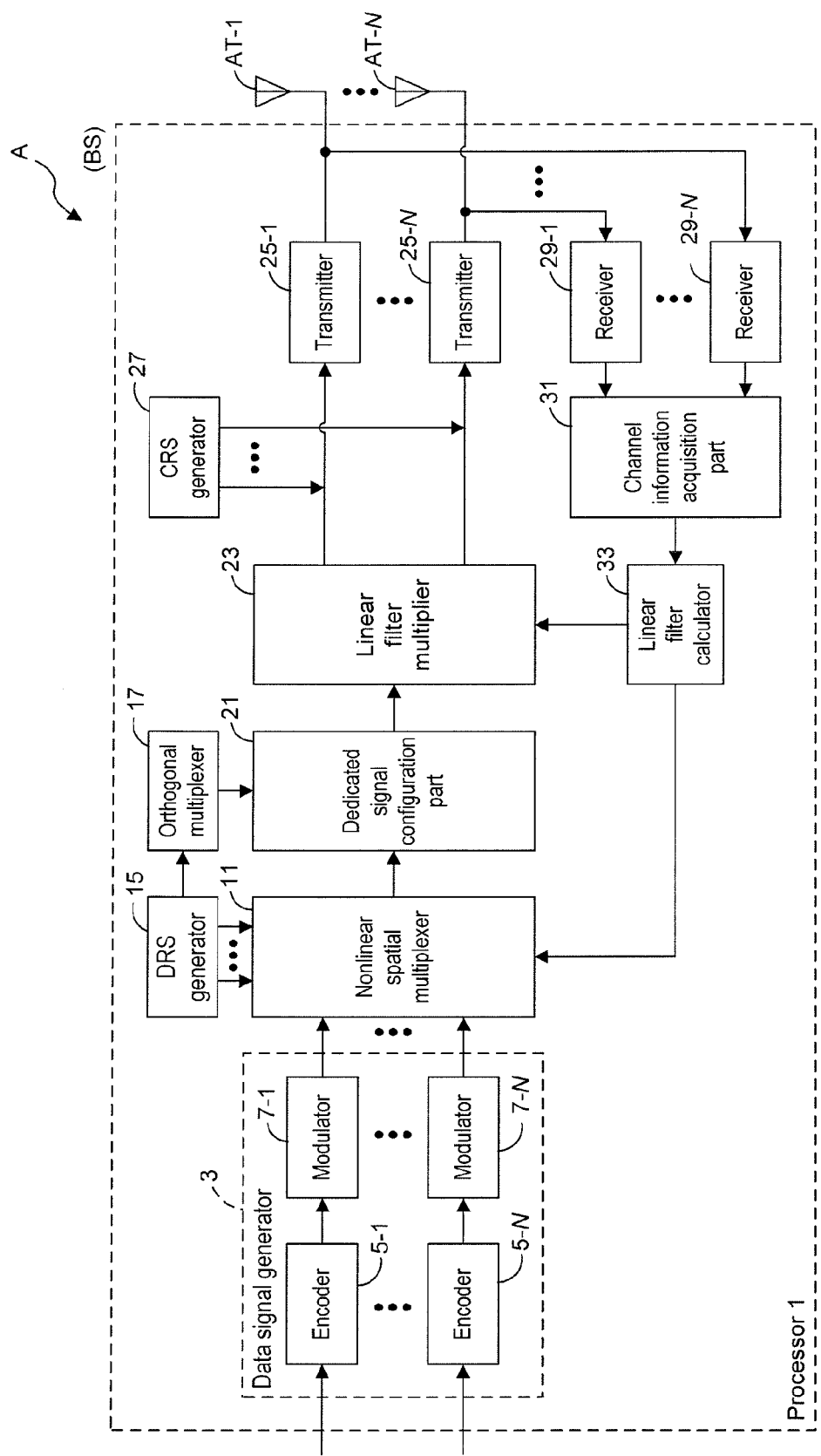
FIG. 1 is a functional block diagram showing an exemplar configuration of a BS in a first embodiment of the present invention.
Figure 11:
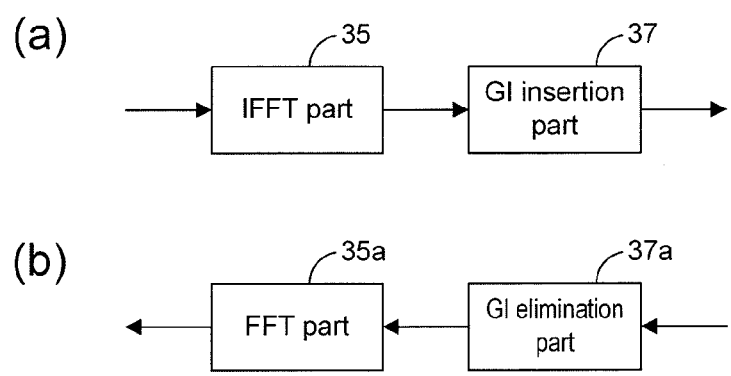

FIG. 11 is a diagram showing configurations of function parts to be provided between a linear filter multiplier and each of transmitters in FIG. 1 in a configuration of a BS in a second embodiment of the present invention, in a case of performing downlink OFDM communication.

Figure 12:
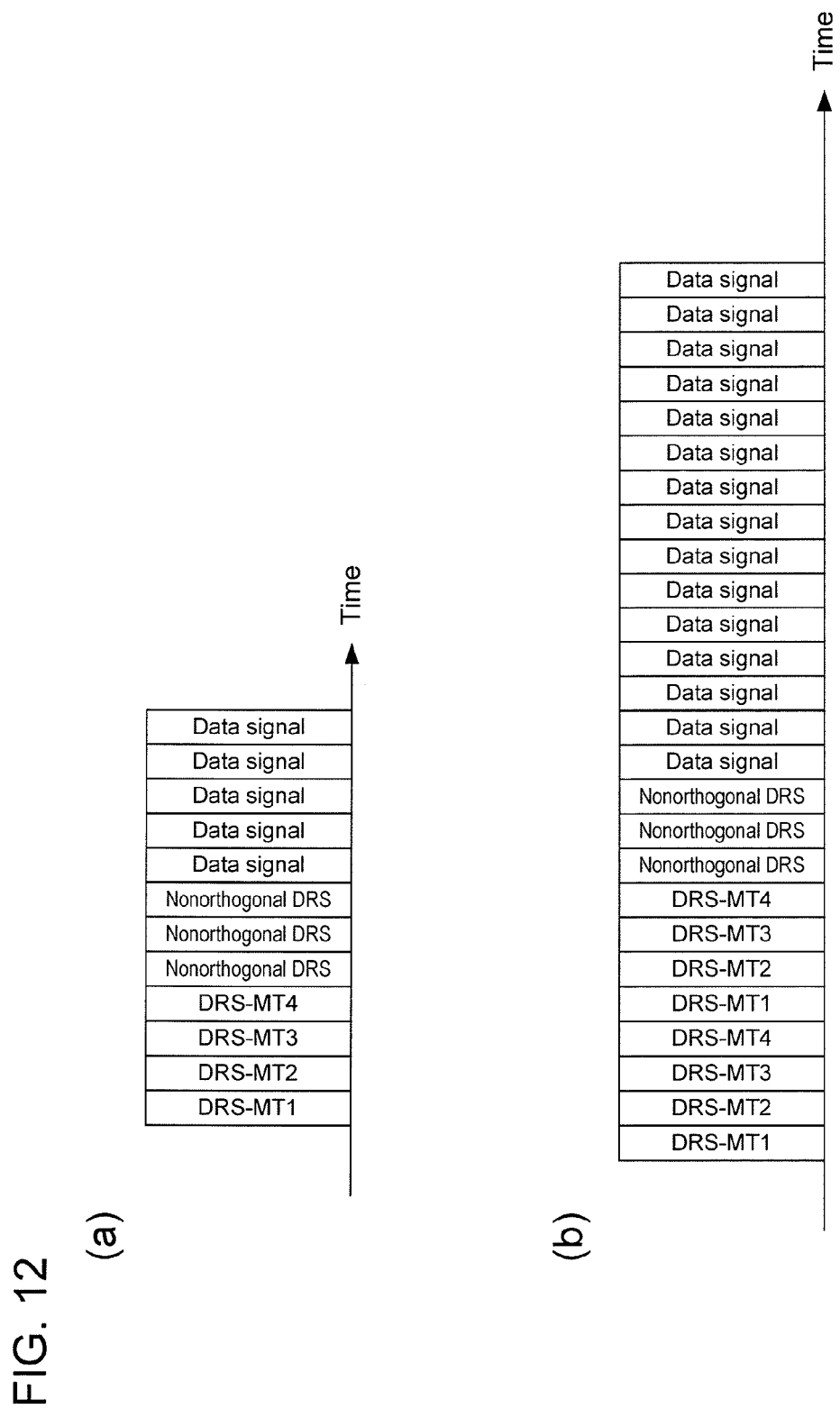

FIG. 12 is a diagram showing exemplar frame configurations including data signals, orthogonal DRSs and nonorthogonal DRSs in the second embodiment of the present invention.

Figure 13:
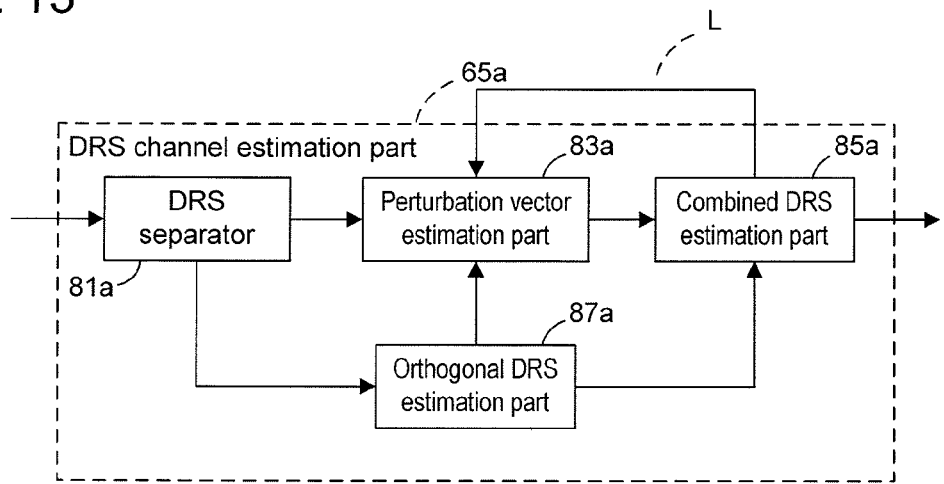

FIG. 13 is a diagram showing an exemplar configuration of a DRS channel estimation part in the second embodiment of the present invention.

Figure 14:
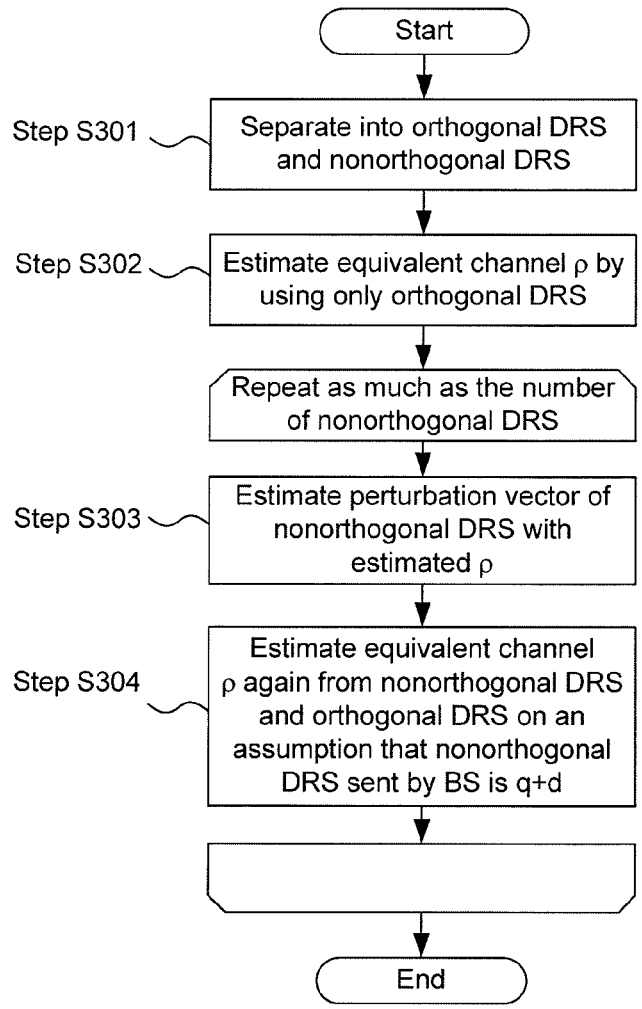

FIG. 14 is a flowchart showing a flow of an operation corresponding to the DRS channel estimation part shown in FIG. 13.

Figure 15:
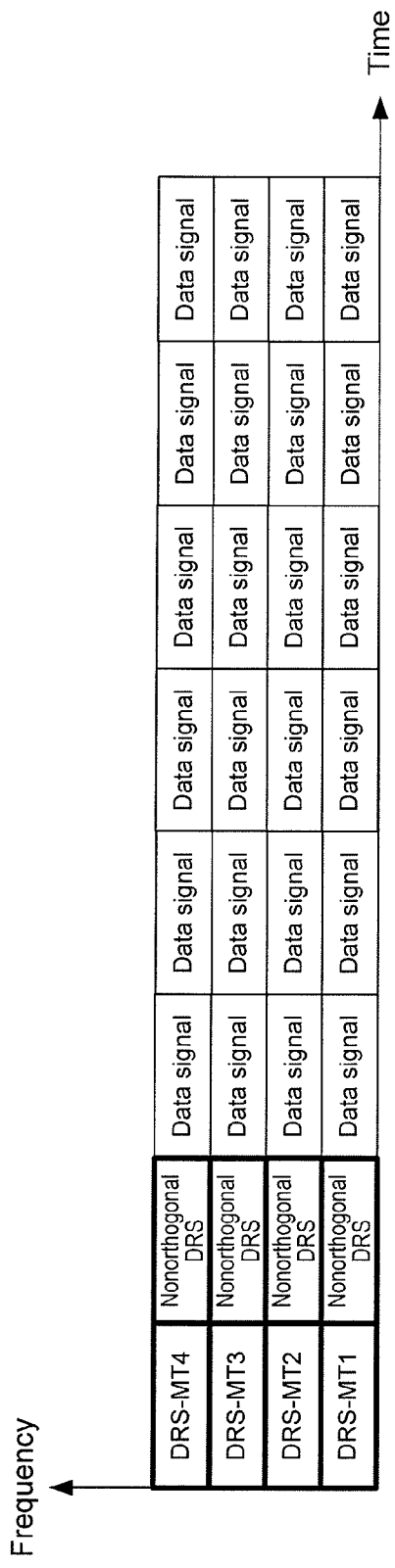

FIG. 15 is a diagram showing an exemplar frame configuration in which orthogonal DRSs (DRS-MT1 to DRS-MT4) are frequency-division multiplexed, and nonorthogonal DRSs are also frequency-division multiplexed.

FIG. 16 is a diagram showing exemplar frame configurations in which orthogonal DRSs and a nonorthogonal DRS are multiplexed in a frequency domain.

Figure 17:
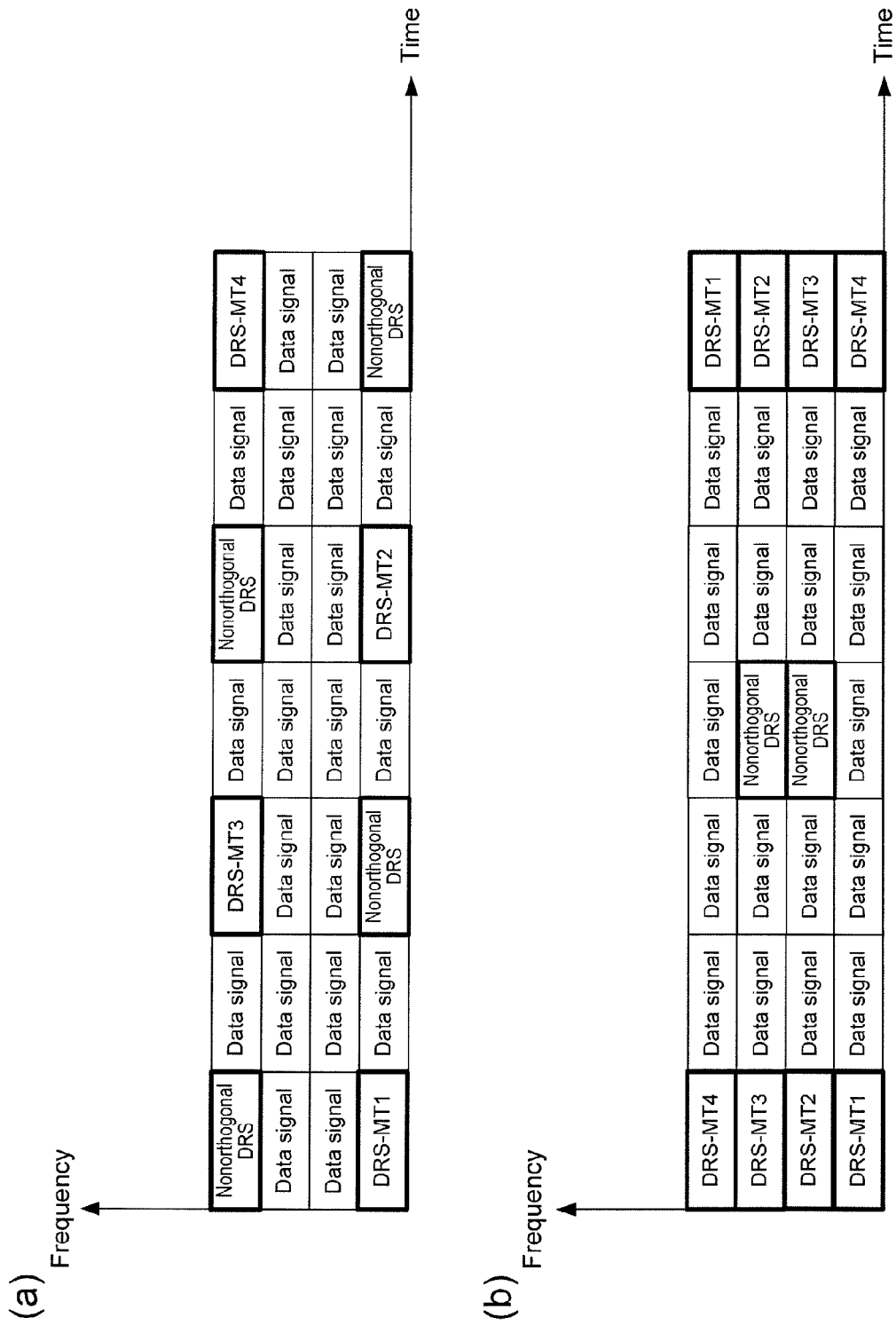

FIG. 17 is a diagram showing exemplar frame configurations in which multiplexing is performed in both frequency and time domains.

Figure 18:
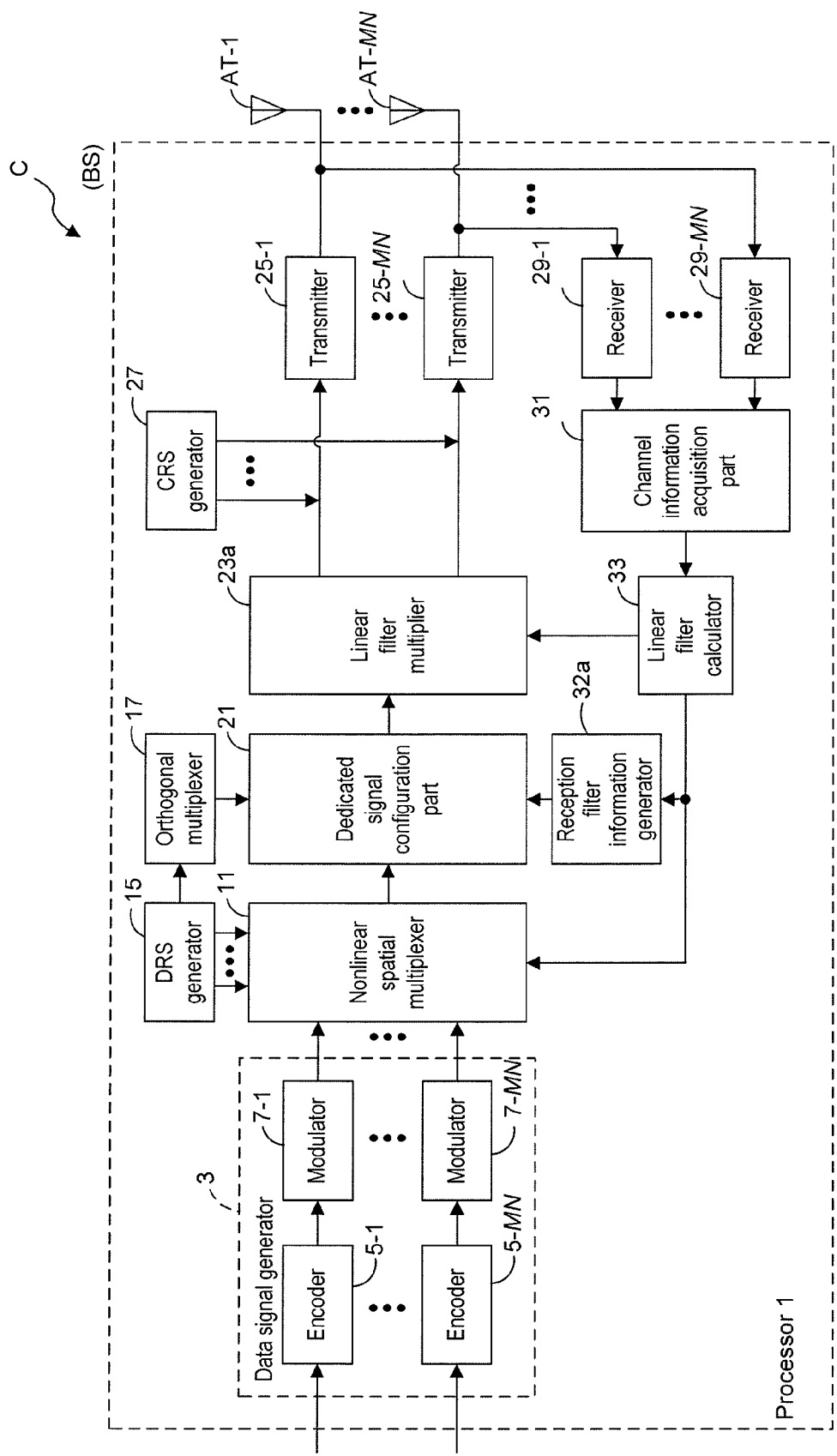

FIG. 18 is a diagram showing an exemplar configuration of a BS in a third embodiment of the present invention.

Figure 19:
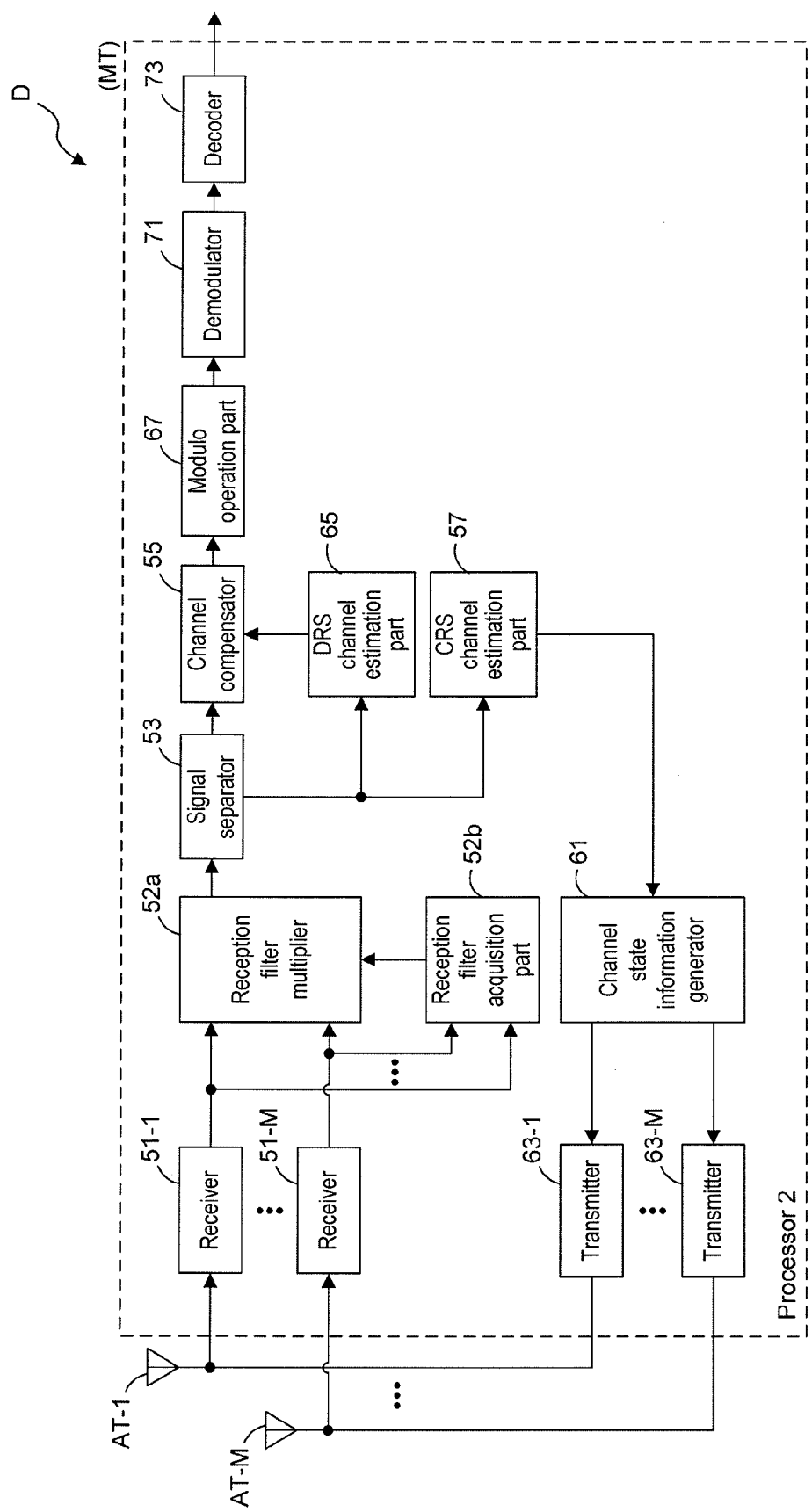

FIG. 19 is a diagram showing an exemplar configuration of an MT in the third embodiment of the present invention.

Figure 20:
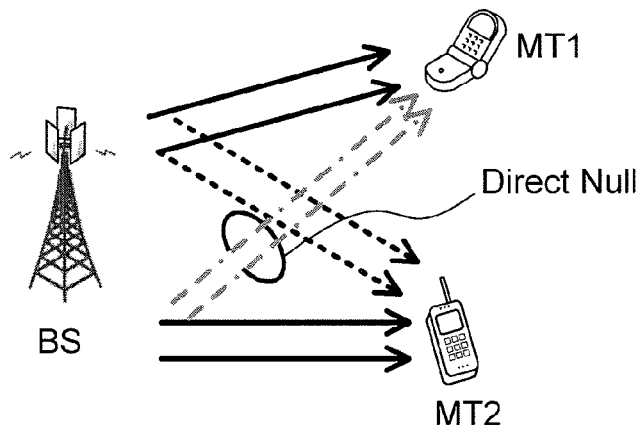

FIG. 20 is a conceptual diagram showing a relationship among a BS, MT1 and MT2.

Figure 21:
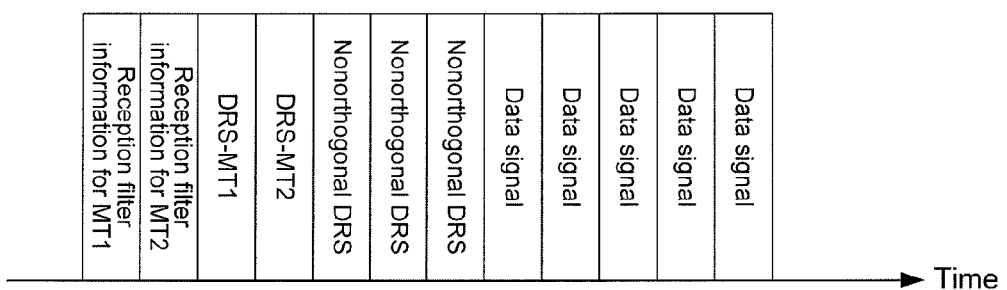

FIG. 21 is a diagram showing an exemplar frame configuration.

Figure 22:
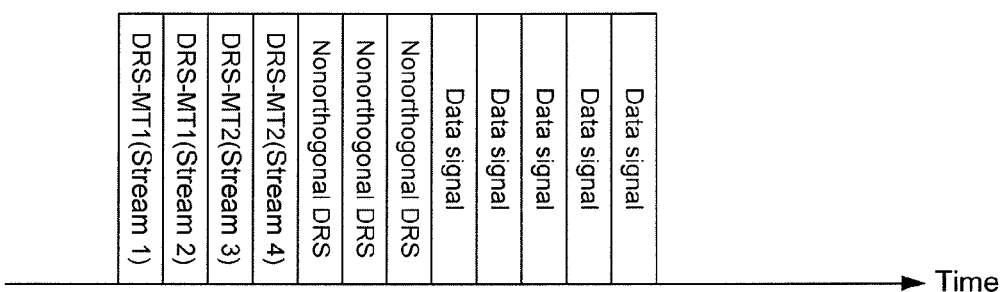

FIG. 22 is another diagram showing an exemplar frame configuration.

Figures 23, 24:
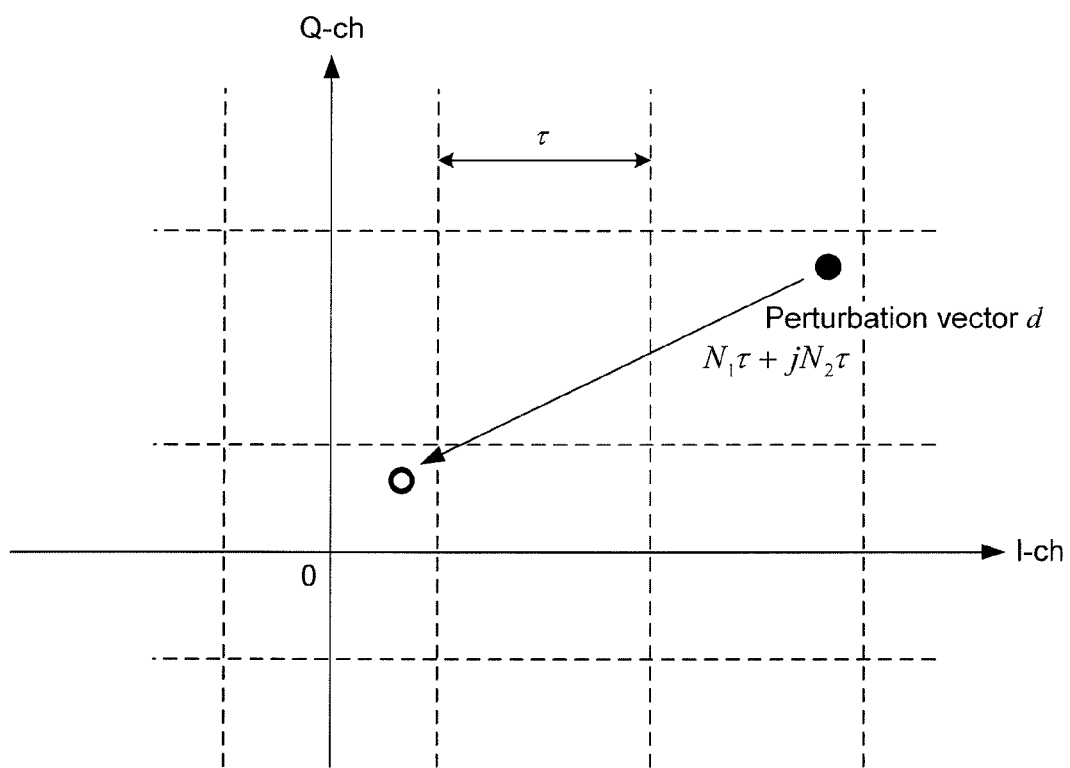

FIG. 23 is an example of a codebook to be shared in advance by a BS and an MT.

FIG. 24 is a diagram showing an example of a Modulo operation of adding a signal being an integer multiple of a known value τ to an I-ch (In-phase channel) and a Q-ch (Qadrature channel) of a transmission signal by both the transmission and reception sides, to convert the signal into a signal within a range of $[-\tau/2, \tau/2]$.

Figure 25:
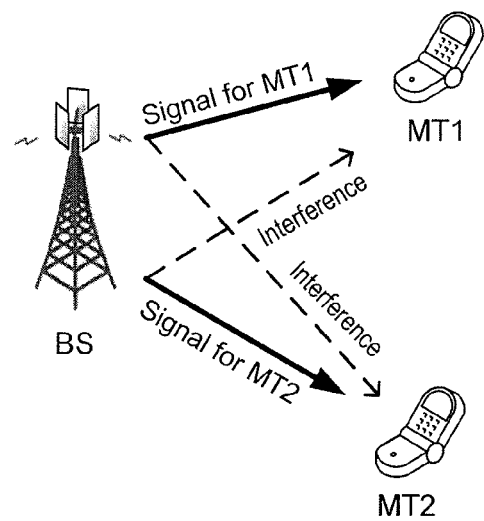

FIG. 25 is a diagram showing a state where a base station transmits signals to multiple terminals at the same time point at the same frequency.

Figure 26:
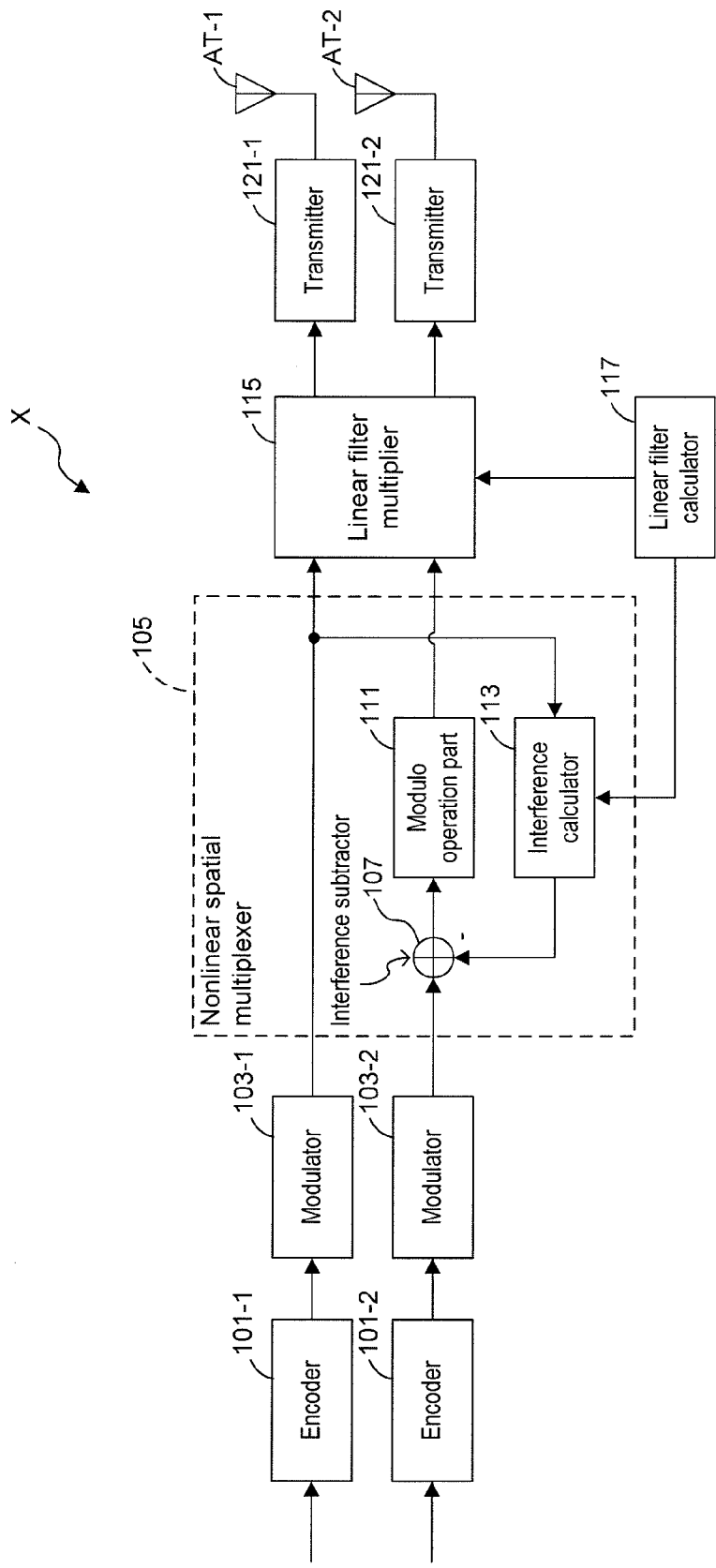

FIG. 26 is a diagram showing a concrete configuration example of a BS for achieving communication with two MTs.

Figure 27:
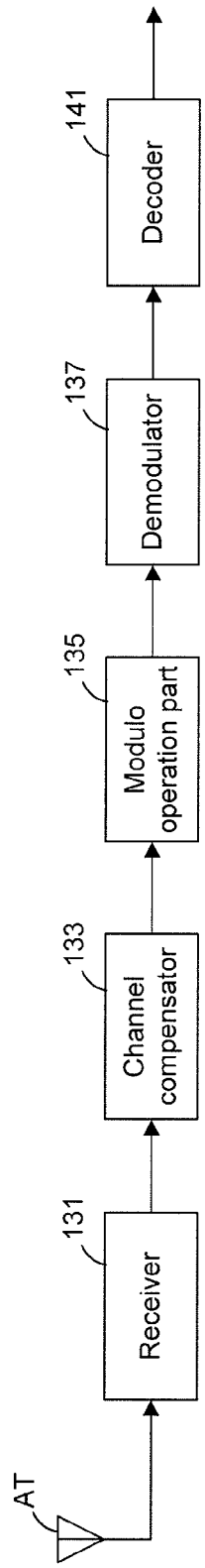

FIG. 27 is a diagram showing a concrete configuration example of an MT for achieving communication with two MTs.

Figure 28:
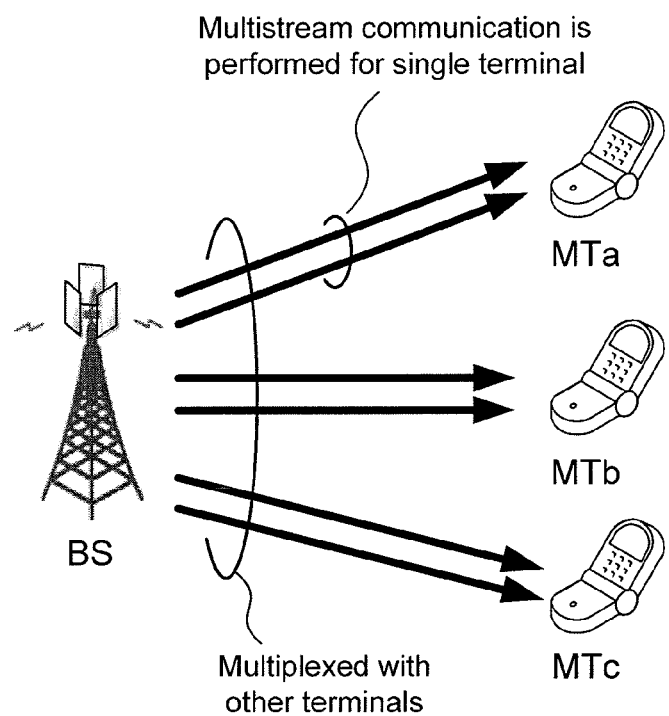

FIG. 28 is a diagram showing a state in which MTs each performing multi-stream communication are spatially multiplexed.

Figure 29:
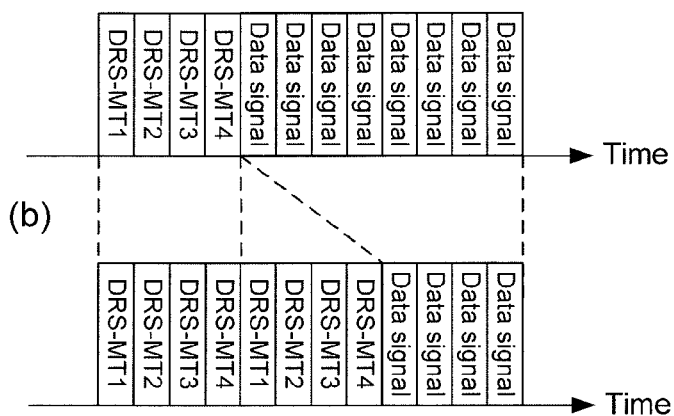

FIG. 29 is a diagram showing a state in which DRSs divided and allocated to orthogonal radio resources (called "orthogonal DRSs" below) are time-division multiplexed for the number of spatially-multiplexed MTs, and spatially-multiplexed data signals are transmitted with the remaining symbols.

Figure 30:
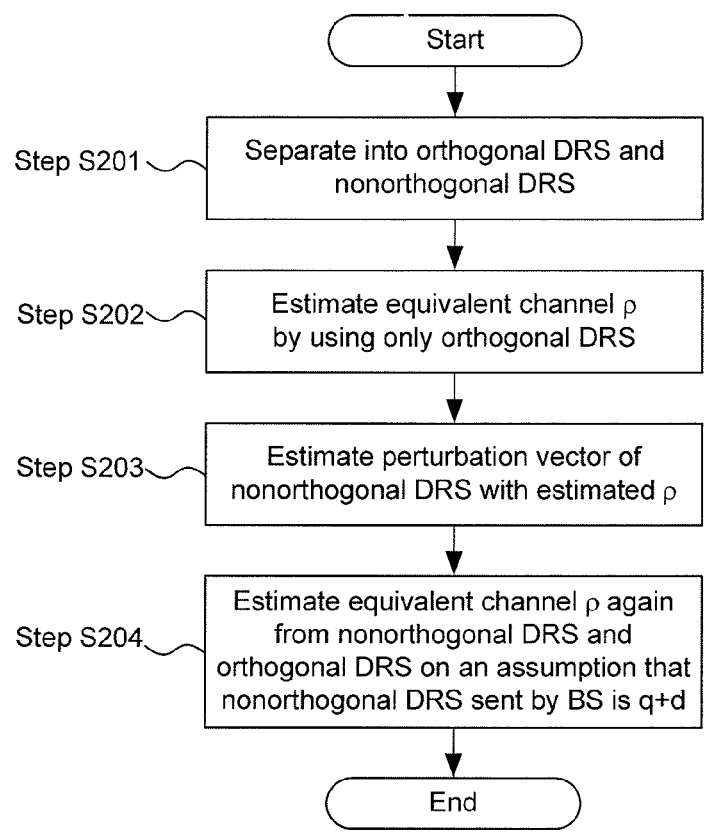

FIG. 30 is a flowchart showing a flow of processing of the first embodiment.

MODES FOR CARRYING OUT THE INVENTION

Hereinbelow, a description will be given of a mobile communication technique according to embodiments of the present invention.

<First Embodiment>

In a first embodiment of the present invention, a base station (BS) transmits an orthogonal DRS to each mobile terminal MT, and also transmits DRSs for the respective MTs by nonlinear-spatial multiplexing like in the method used for data signals. The DRS is referred to as "nonorthogonal DRS." The MT performs channel estimation by using both the orthogonal DRS and the nonorthogonal DRS. Hereinafter, a detailed configuration of this embodiment will be described with reference to the drawings.

1) Configuration of BS

FIG. 1 is a functional block diagram showing an exemplar configuration of a BS in this embodiment. While the conventional example in FIG. 26 has been described for the case where the number of MTs and the number of antennas of the BS are both two to simplify the description, the exemplar configuration in FIG. 1 will be described for a case including an arbitrary N number of MTs.

As shown in FIG. 1, a BS (A) generates common reference signals (CRS) for each of antennas AT-1 to N by a CRS generator 27, and inputs the CRS to transmitters 25-1 to N. The transmitters 25-1 to N perform digital-to-analog conversion on the inputted CRS to upconvert them into radio signals of carrier frequencies, and transmit the CRS to MTs via the antennas AT-1 to N. Then, the MTs estimate states of channels from the respective antennas of the BS on the basis of the CRS, and transmit radio signals (channel state signals) containing channel state information to the BS (A).

Receivers 29-1 to N of the BS receive channel state signals via the antennas AT-1 to N, downconvert the channel state signals into baseband digital signals, and input the baseband digital signals to a channel state information acquisition part 31. These baseband digital signals contain channel state information to be notified by the MTs to the BS. The channel state information acquisition part 31 acquires channel state information from the baseband digital signals, and inputs the information to a linear filter calculator 33. The linear filter calculator 33 calculates a linear filter and interference coefficient information from the channel state information by the same method as described in the conventional example, and inputs the linear filter to a linear filter multiplier 33 and the interference coefficient information to a nonlinear spatial multiplexer 11. An operation of this linear filter calculator 33 in the case where the number of MTs is generalized to N will be described in detail later.

A DRS generator 15 generates DRSs for the respective MTs and inputs the DRSs to the nonlinear spatial multiplexer 11. In this configuration, the DRSs inputted by the DRS generator 15 to the nonlinear spatial multiplexer 11 are referred to as DRSs of a first group. Additionally, the DRS generator 15 generates the DRSs for the respective MTs again and inputs the DRSs to an orthogonal multiplexer 17. In this configuration, the DRSs inputted by the DRS generator 15 to the orthogonal multiplexer 17 are referred to as DRSs of a second group. The nonlinear spatial multiplexer 11 performs nonlinear-spatial multiplexing on the inputted DRSs for the MTs, to generate a nonorthogonal DRS and inputs it to a dedicated signal configuration part 21. The nonlinear spatial multiplexer 11 operates in the same manner as that shown in the conventional example of FIG. 26. Note, however, that while nonlinear-spatial multiplexing is performed only on the data signals in the conventional example, nonlinear-spatial multiplexing is performed on the DRSs as well as on the data signals in this embodiment. Additionally, an operation of the nonlinear spatial multiplexer in the case where the number of MTs is generalized to N will be described in detail later.

Moreover, the orthogonal multiplexer 17 multiplexes the inputted DRSs by allocating them to radio resources orthogonal to one another, thereby generating orthogonal DRSs and inputs them to the dedicated signal configuration part 21. Here, to allocate the DRSs to the orthogonal radio resources when the number of MTs is 4, for example, time-division multiplexing (TDM), code-division multiplexing (CDM) or a similar method may be used, as shown in FIG. 2. In FIG. 2, the orthogonal DRSs for MTs are shown as DRS-MT1, DRS-MT2, and so on. Additionally, as will be described later, in a case of performing multi-carrier communication by orthogonal frequency-division multiplexing or the like, multiplexing may be performed by combining FDM in addition to TDM and CDM. Hereinbelow, a case of multiplexing orthogonal DRSs by TDM will be described as an example.

Encoders 5-1 to N convert information bits for the respective MTs into error correcting codes, and input the coded bits to modulators 7-1 to N. The modulators 7-1 to N modulate the inputted bits, generate modulated signals and input the modulated signals to the nonlinear spatial multiplexer 11. In this configuration, a component including the encoders 5-1 to N and the modulators 7-1 to N are referred to as a data signal generator 3. The modulated signal is hereinafter referred to as a data signal. The nonlinear spatial multiplexer 11 performs on the inputted data signals for the MTs the same nonlinear-spatial multiplexing as was performed on the nonorthogonal DRS, thereby generating data signals after the nonlinear-spatial multiplexing, and inputs them to the dedicated signal configuration part 21.

The dedicated signal configuration part 21 configures a dedicated signal with data signals, a nonorthogonal DRS and orthogonal DRSs. An example of such a frame configuration of a signal when the number of MTs is 4, for example, is shown in FIG. 3. Since the nonorthognonal DRS includes signals for the respective MTs multiplexed therein as in the case of the data signal, the nonorthogonal DRS can transmit signals to all of the MTs in a time period of a single symbol.

The dedicated signal configuration part 21 inputs the thus configured dedicated signals to the linear filter multiplier 23. The linear filter multiplier 23 multiplies each of the inputted dedicated signals by a linear filter to thereby generate signals corresponding to the respective antennas and inputs them to the transmitters 25-1 to N.

The transmitters 25-1 to N perform digital-to-analog conversion on the inputted signals corresponding to the respective antennas to upconvert the signals into radio signals of a carrier frequency, and transmit the signals for the MTs to the respective MTs via the antennas.

2) Configuration of MT

An exemplar configuration of an MT in the embodiment will be described with reference to FIG. 4A and FIG. 4B. A receiver 51 of MT (B) receives a signal containing CRS transmitted by the BS via an antenna AT, downconverts the signal into a baseband digital signal, and inputs the signal to a signal separator 53. The signal separator 53 separates the CRS corresponding to each antenna of the BS from the baseband digital signal, and inputs the CRS to a CRS channel estimation part 57. The CRS channel estimation part 57 estimates channel states from the BS to the own MT on the basis of the received CRS, and inputs the estimated channel state information to a channel state information generator 61. The channel state information generator 61 inputs channel state signals to a transmitter 63 by using the channel state information. The transmitter 63 performs digital-to-analog conversion on the inputted channel state signals to upconvert them into radio signals of a carrier frequency, and transmits the channel state signals to the BS via the antenna AT.

In addition, the receiver 51 of the MT receives a signal including orthogonal DRSs, a nonorthogonal DRS and data signals via an antenna, downconverts the signal into a baseband digital signal and inputs the baseband digital signal to the signal separation part 53. The signal separation part 53 separates the baseband digital signal into orthogonal DRSs, a nonorthogonal DRS and data signals, and then inputs the DRSs to a DRS channel estimation part 65 and the data signals to a channel compensator 55. The DRS channel estimation part 65 estimates channels according to the inputted orthogonal DRSs and nonorthogonal DRS, and inputs information indicating channel states to the channel state compensator 55. The channel state compensator 55, whose detailed principle will be described later, enables highly accurate channel estimation, the accuracy being as high as the case shown in part (b) of FIG. 29 where two of each of the orthogonal DRSs are transmitted.

The channel compensator 55 uses information indicating channel states to perform channel compensation on the data signals, and inputs them to a Modulo operation part 57. The Modulo operation part 57 carries out Modulo operations on the data signals and inputs the data signals after the Modulo operation to a demodulator 71. The demodulator 71 demodulates the data signals after the Modulo operation and inputs the demodulation result to a decoder 73. The decoder 73 performs decoding on the inputted demodulation result and outputs information bits.

Next, the DRS channel estimation part of the MT will be described in detail in comparison to the conventional channel estimation method. Conventionally, DRSs of the MTs have been transmitted by time-division multiplexing. A frame configuration as shown in part (a) of FIG. 5 has been used, for example Here, if the respective DRSs are to be transmitted to the MTs again for improving the channel estimation accuracy, an exemplar configuration as shown in part (b) of FIG. 5 is used.

However, as shown in part (b) of FIG. 5, orthogonal symbols of the number of MTs are required, and therefore less symbols are available to transmit data signals, resulting in degradation of the transmission rate.

For this reason, a nonorthogonal DRS is transmitted in addition to the orthogonal DRSs allocated by time division, as shown in part (c) of FIG. 5. The nonorthogonal DRS can transmit DRSs to all of the MTs with a single symbol. Accordingly, the DRS can be transmitted twice to all of the MTs while minimizing reduction of area for allocating data signals An exemplar configuration of the DRS channel estimation part 65 is shown in FIG. 4B, and a flowchart showing an operation of the part is shown in FIG. 30. In this description, $\rho$ represents a channel to be estimated by each MT ($\rho$ is each diagonal component denoted by $r_{kk}^*$ of an equivalent channel $R^H$ shown in later mentioned formula (15)). Assume that the transmission side transmits a reference signal q also known to the reception side as an orthogonal DRS, and q+d as a nonorthogonal DRS. Here, as has been described with reference to FIG. 24, d is a perturbation vector added in the Modulo operation on the transmission side and having a size as large as an integer multiple of $\tau$ in each of I-ch and Q-ch directions, which in this embodiment is added in the Modulo operation by the nonlinear spatial multiplexer on the transmission side.

In addition, $y_{orth}$ represents a reception signal corresponding to the orthogonal DRS, and $y_{nonorth}$ represents the reception signal corresponding to the nonorthogonal DRS. $n_{orth}$ and $n_{nonorth}$ represent noise contained in $y_{orth}$ and $y_{nonorth}$, respectively. Here, the MT performs channel estimation on the assumption that variations in a channel used by the orthogonal DRS and in a channel used by the nonorthogonal DRS are ignorable.

In the DRS channel estimation part 65, a DRS separator 81 firstly separates DRSs into orthogonal DRSs and a nonorthogonal DRS, and inputs the orthogonal DRS $y_{orth}$ to an orthogonal DRS estimation part 87 and the nonorthogonal DRS $y_{nonorth}$ to a perturbation vector estimation part 83 (step S201).

Thereafter, the orthogonal DRS estimation part 87 estimates an equivalent channel $\rho$ by using only the orthogonal DRS. The estimation result $\rho_{orth}$ is expressed as:

[Formula 12]

$$\rho_{orth} = \frac{y_{orth}}{q} = \frac{\rho q + n_{orth}}{q} = \rho + \frac{n_{orth}}{q}. \tag{12}$$

Specifically, $\rho_{orth}$ contains an error $n_{orth}/q$ due to noise. The orthogonal DRS estimation part 87 inputs this $\rho_{orth}$ to the perturbation vector estimation part 83 (step S202).

In the perturbation vector estimation part 83, the nonorthogonal DRS $y_{nonorth}$ received by the MT and the $\rho_{orth}$ estimated by the orthogonal DRS estimation part 87 are used to estimate a sum q+d of the reference signal and the perturbation vector. A concrete estimation method is shown in FIG. 7. In FIG. 7, x indicates a value of $y_{nonorth}/\rho_{orth}$. In FIG. 7, ● indicates a candidate point of q+d. The candidate points ● are arranged on lattice points because possible values of the perturbation vector d exist in the I-ch direction and in the Q-ch direction at Modulo width $\tau$ intervals. The perturbation vector estimation part 83 estimates a candidate point ● closest to $y_{nonorth}/\rho_{orth}$ indicated by x as the nonorthogonal DRS actually transmitted from the BS. In FIG. 7, the candidate point ● pointed by a downward arrow "↓" is the value of q+d obtained as the estimation result, where d=1·$\tau$+j·1·$\tau$. The perturbation vector estimation part 83 inputs this estimation result q+d and the received nonorthogonal DRS signal $y_{nonorth}$ to a combined DRS estimation part 85 (step S203).

In the combined DRS estimation part 85, two DRSs signals including the orthogonal DRS (reference signal denoted by q, and reception signal denoted by $y_{orth}$) and the nonorthogonal DRS (reference signal denoted by q+d, and reception signal denoted by $y_{nonorth}$) are used to perform channel estimation. In this embodiment, a single channel estimation result is calculated from two DRSs by maximum-ratio combining, for example.

[Formula 13]

$$\rho_{mrc} = \frac{|q+d|^2 \rho_{nonorth} + |q|^2 \rho_{orth}}{|q+d|^2 + |q|^2} \qquad (13)$$
$$= \rho + \frac{|q+d|n_{monorth} + |q|n_{orth}}{|q+d|^2 + |q|^2}.$$

Finally, the combined DRS estimation part 85 outputs the above value $\rho_{mrc}$, and inputs it to the channel compensator 55 (step S204).

By using this method, channel estimation can be performed as shown in part (c) of FIG. 5 where a nonorthogonal DRS is used in addition to orthogonal DRSs. As compared with part (a) of FIG. 5 where only orthogonal DRSs are transmitted, accuracy of channel estimation can be largely improved while degradation in the transmission rate is minimized.

Note that this embodiment is also applicable to a case of transmitting the orthogonal DRSs multiple times in a frame, as shown in part (a) of FIG. 6. Specifically, by adding the nonorthogonal DRS as shown in part (b) of FIG. 6, the accuracy of channel estimation can be improved while degradation in the transmission rate is minimized At this time, each MT combines the received multiple orthogonal DRSs by a known technique, such as averaging channel estimation values estimated by use of the respective orthogonal DRSs, and then inputs the result to the combined DRS estimation part 85. Note that a method of transmitting the nonorthogonal DRS multiple times in a frame will be described in a second embodiment.

3) Case of N MTs

Next, a detailed description will be given of the linear filter calculator 33 and the nonlinear spatial multiplexer 11 in a case where the number of MTs is an arbitrary number N. Even when there are N MTs, parts other than the nonlinear spatial multiplexer 11 have basically the same configuration as in the case where there are two MTs.

Firstly, an operation of the linear filter calculator 33 will be described in detail. In this description, a matrix H (called "channel matrix" below) represents complex gain of a channel from the q-th transmission antenna of the BS to the p-th MT. In addition, s represents a modulated signal generated on the transmission side. s is an N-dimensional complex column vector, and components of s are modulated signals obtained by encoding and modulating information bits. Signals for N MTs are calculated in FIG. 8, and the N MTs are sequentially referred to as MT1 to MTN from the top in the following description. Firstly, the linear filter calculator 33 calculates a linear filter and interference coefficient information. To be specific, QR decomposition is performed on the Hermitian conjugate $H^H$ of the channel H as:

[Formula 14]

$$H^H = QR \qquad (14)$$

Here, the obtained Q is inputted as a linear filter to the linear filter multiplier 23. Moreover, a combination of the linear filter Q and the actual channel H can be considered as an equivalent channel expressed as:

[Formula 15]

$$HQ = R^H Q^H Q = R^H \qquad (15)$$

$R^H$ is a lower triangular matrix in which in the first row, components apart from the diagonal component (component of first row first column) are 0. In addition, matrix A is assumed to be a diagonal matrix consisting only of diagonal components of $R^H$. Q represents the linear filter outputted by the linear filter calculator 33, and $A^{-1}R^H - I$ (=B in this description) represents the interference coefficient information. $A^{-1}$ represents an inverse matrix of A. $R^H$ is multiplied by $A^{-1}$ because, as in formula (8), it is necessary to calculate a coefficient for obtaining an interference signal contained in the reception signal after channel compensation by each MT. A unit matrix I is subtracted to remove components corresponding to data signals and calculate only the interference components. The linear filter calculator 33 calculates a linear filter and interference coefficient information by the method described above, and inputs the linear filter Q to the linear filter multiplier 23 as well as inputs the interference coefficient information B to the interference calculator 41.

Next, an operation of the nonlinear spatial multiplexer 11 will be described in detail with reference to FIG. 8 showing a detailed configuration of the nonlinear spatial multiplexer 11, and FIG. 9 and FIG. 10 which are flowcharts. Firstly, a description will be given of an operation of the nonlinear spatial multiplexer 11 when data signals are inputted thereto. At first, processing is started (Start) and an interference calculator 41 acquires interference coefficient information calculated by the linear filter calculator 33 (step S1 of FIG. 9). Subsequently, 1 is assigned to a variable k taking values from 1 to N (step S2). Then, a data signal $s_1$ for MT1 is defined as $v_1$ (step S3). Here, $v_1, \ldots, v_N$ are signals inputted to the dedicated signal configuration part 21, and $v_2, \ldots, V_N$ are calculated in the processing from step S4 to step S10. Hereinbelow, an operation in a case where k takes any of values 2 to N is generally described by use of the variable k.

First, 1 is added to the variable k (k=k+1: step S4). Then, the interference calculator 41 calculates an interference signal $f_k$ that MTk undergoes by using the following formula (step S5):

[Formula 16]

$$f_k = r^*_{1k} v_1 + \ldots + r^*_{kN} v_N$$

$$\Sigma_{u=1}^{k-1} r^*_{uk} v_n \qquad (16)$$

Here, a component of row p column q of R in formula (15) is expressed as $r_{pq}$. The interference calculator 41 inputs an interference signal $f_k$ to an interference subtractor 41-k corresponding to MTk. Then, the interference subtractor 41-k subtracts $f_k$ from a data signal $s_k$ and calculates a signal $s_k - f_k$ (step S6). In addition, the interference subtractor 41-k inputs the signal $s_k - f_k$ to a Modulo operation part 43-k corresponding to MTk.

Modulo operation parts 43-2 to N are arranged to respectively connect to interference subtractors 41-2 to N corresponding to the MTs MT2 to N. Each of the Modulo operation parts 43-2 to N carries out a Modulo operation shown in formula (1) on a signal inputted thereto and defines a resultant signal $Mod(s_k - f_k)$ as $v_k$ (step S7). In addition, the Modulo operation part 43-k inputs $v_k$ to the interference calculator 41 (step S8). If k=N, the processing proceeds to step S10, and if not, the processing returns to step S4 to calculate $v_{k+1}$ of the MT of the next number (step S9). In the end, a signal $v=(v_1, v_2, \ldots v_N)^T$ is inputted to the dedicated signal configuration part 21 (step S10).

Additionally, while the operation of the nonlinear spatial multiplexer 11 upon input of the data signal has been described herein, completely the same operation is carried out when a nonorthogonal DRS is inputted thereto, as shown in a flowchart (FIG. 10). In FIG. 10, data signal $s_k$ is replaced by nonorthogonal DRS $q_k$, interference $f_k$ is replaced by interference $g_k$, and the signal v to be inputted to the dedicated signal configuration part 21 is replaced by signal u.

Note that a Modulo width may vary between a nonorthogonal DRS and a data signal. For example, when a nonorthogonal DRS is transmitted at a transmission rate×times the transmission rate of a data signal, the Modulo operation parts 43-2 to N makes the Modulo width √×times larger. It is also preferable that a Modulo width is changed appropriately depending on modulation schemes of data signals.

<First Modified Example of First Embodiment>

Although the description has been given of the case of single-carrier communication, the first embodiment is also applicable to systems performing OFDM in the downlink, the uplink, or both. In a case of performing OFDM in the downlink, the method described in the first embodiment is carried out for each subcarrier, or each unit being a group of some of the subcarriers.

In the case of performing OFDM communication in the downlink, a BS configuration includes an IFFT part 35 and a GI (Guard Interval) insertion part 37 shown in part (a) of FIG. 11 inserted between the linear filter multiplier 23 and each of the transmitters 25 of FIG. 1. The CRS generator 27 inputs a CRS to the IFFT part 35. The same number of the IFFT part 35 and the GI insertion part 37 as the number of the transmitters 25 exist, each IFFT part 35 is connected to the linear filter multiplier 23, and the GI insertion parts 37 are respectively connected to the transmitters 25-1 to N. The IFFT part 35 performs IFFT on the CRS and a signal outputted from the linear filter multiplier 23, generates a baseband digital signal and inputs the baseband digital signal to the GI insertion part 37. The GI insertion part 37 adds a GI to the baseband digital signal and inputs the signal added the GI to each of the transmitters 25-1 to N. Operations other than those of these two parts are the same as the scheme mentioned above.

In the case of performing OFDM communication in the downlink, an MT configuration includes a GI elimination part 37a and an FFT part 35a shown in part (b) of FIG. 11 inserted between the receiver 51 and the signal separator 53 of FIG. 4A. Operations other than those of these two parts are the same as the scheme mentioned above. The GI elimination part 37a eliminates the GI from the baseband digital signal inputted to the receiver 51 and inputs the signal to the FFT part 35a. The FFT part 35a performs FFT on the baseband digital signal from which the GI is eliminated, calculates a signal in a frequency domain, and inputs the signal in the frequency domain to the signal separator 53.

In the case of performing OFDM communication in the uplink, a BS configuration includes the GI elimination part 37a and the FFT part 35a shown in part (b) of FIG. 11 inserted between each of the receivers 29-1 to N and the channel information acquisition part 31 of FIG. 1. The same number of the GI elimination part 37a and the FFT part 35a as the number N of the transmitters 25 exist, each FFT part 35a is connected to the channel information acquisition part 31, and the GI elimination parts are respectively connected to the receivers. Operations of the GI elimination part and the FFT part are the same as the operations of the GI elimination part and the FFT part in the above case of performing OFDM communication in the downlink, and thus are omitted.

In the case of performing OFDM communication in the uplink, an MT configuration includes the IFFT part 35 and the GI insertion part 37 shown in part (a) of FIG. 11 inserted between the channel state information generator 61 and the transmitter 63 of FIG. 4A. Operations of the IFFT part 35 and the GI insertion part 37 are the same as the operations of the IFFT part and the GI insertion part in the above case of performing OFDM communication in the uplink, and thus descriptions thereof are omitted.

Moreover, although in part (c) of FIG. 5 the DRSs and the data signals are arranged in the time domain, in the case of performing OFDM communication, the DRSs and the data signals may be arranged in the frequency domain instead of the time domain, or may be arranged in both the time domain and the frequency domain.

Note that other than the linear filter calculation method described in this embodiment, the embodiment is applicable to MU-MIMO THP using a linear filter based on an MMSE criterion described in the aforementioned non-patent document 2, or a method using ordering also described in non-patent document 2 may be used.

In addition, since the first MT to calculate a signal (MT1 in flowcharts of FIG. 9 and FIG. 10) is not interfered by other MTs, the BS does not carry out the Modulo operation as in FIG. 8 on the signal for this MT. For this reason, in this MT, all DRSs may be regarded as orthogonal DRSs, and be combined by a known technique such as averaging channel estimation values estimated by use of the respective DRSs.

Moreover, when the MT notifies the BS of the information estimated on the basis of the CRS, the BS may be notified of quantized values indicating components of H being a matrix representing the channel state. Otherwise, the BS and the MT may share a table (called "Codebook" below) as shown in FIG. 23 in advance, so that the MT can select, based on the CRS, one of 0 to 7 numbers corresponding to a channel directed thereto from among 8 channel information values in FIG. 23, and notify the BS of the selected number. The form of the Codebook is not limited to that shown in FIG. 23, as a matter of course, and other Codebooks may be used.

The term "frame" in the present invention at least includes (1) a DRS and (2) a signal to be subjected to demodulation and decoding processing by use of a channel estimation result estimated from the DRS, and is a unit having a certain width in the time domain, in the frequency domain or in both domain. In addition, the term does not necessarily need to match with "frame" in a general meaning or "frame" defined in a specification and the like.

Furthermore, functions according to the BS of the above method may be executed in a processor 1 as shown in FIG. 1. The processor 1 includes the receivers, the channel information acquisition part, the CRS generator and the data signal generator in addition to the DRS generator, the orthogonal multiplexer, the nonlinear spatial multiplexer, and the transmitters executing the method of the present invention. However, the configuration is not limited to this, and may only include the DRS generator, the nonlinear spatial multiplexer, the orthogonal multiplexer and the transmitters, or may include other functions together with this configuration. Additionally, functions according to the MT of the above method may be executed in a processor 2 as shown in FIG. 4A. The processor includes the signal separator, the channel compensator, the CRS channel estimation part, the channel state information generator, the transmitter, the Modulo operation part, the demodulator and the decoder in addition to the receiver and the DRS channel estimation part executing the method of the present application. However, the configuration is not limited to this, and may only include the receiver and the DRS channel estimation part, or may be a configuration including other functions together with the functions.

The processor may be configured of a semiconductor chip, and in that case, may be provided in the form of a monolithic IC, a hybrid IC or a combination of both.

<Second Embodiment>

A description has been given above in the first embodiment of a method of performing channel estimation by using one nonorthogonal DRS. In this embodiment, a description will be given of a method of performing channel estimation by combining multiple nonorthogonal DRSs.

Unlike the first embodiment, a frame configuration of this embodiment including data signals, orthogonal DRSs and nonorthogonal DRSs is as shown in FIG. 12, for example. In addition, a configuration of a BS of this embodiment can be shown by FIG. 1 as in the case of the first embodiment. A configuration of an MT is shown by FIG. 4A as in the case of the first embodiment. Note, however, that the configuration of the DRS channel estimation part 65 is replaced with a configuration shown in FIG. 13. Unlike FIG. 4B, channel estimation is repeatedly performed (reference numeral L) in FIG. 13 between a combined DRS estimation part 85a and a perturbation vector estimation part 83a. This processing is specifically shown in a flowchart (FIG. 14). Hereinafter, operations of FIG. 14 corresponding to a DRS channel estimation part shown in FIG. 13 will be described in comparison with the flowchart (FIG. 30) of the first embodiment. Firstly, a DRS separator 81a separates inputted DRSs into orthogonal DRSs and nonorthogonal DRSs, and inputs the orthogonal DRSs to an orthogonal DRS estimation part 87a, and the nonorthogonal DRSs to the perturbation vector estimation part 83a (step S301). Then, the orthogonal DRS estimation part 87a firstly performs channel estimation and estimates an equivalent channel ρ by using only the orthogonal DRSs (step S302). Step S301 and step S302 are the same operations as step 201 and step 202 in the first embodiment. Next, the perturbation vector estimation part 83a uses one of the received nonorthogonal DRSs signals (called "nonorthogonal DRS 1" below) and the equivalent channel ρ to estimate a perturbation vector of the nonorthogonal DRS 1 like in step S203 in the first embodiment, and inputs a sum of the reference signal and the perturbation vector (expressed in the form of q+d in the first embodiment) as well as an actual reception signal of the nonorthogonal DRS 1 to the combined DRS estimation part 85a (step S303). Thereafter, in the combined DRS estimation part 85a, channel estimation is performed as in step S204 by use of the two DRSs including the orthogonal DRS and the nonorthogonal DRS. The combined DRS estimation part 85a outputs this value ρ and inputs it again to the perturbation vector insertion part 83a (step S304).

Next, the perturbation vector estimation part 83a uses the ρ estimated in step 304 to estimate a perturbation vector of one of nonorthogonal DRSs other than the nonorthogonal DRS 1 estimated earlier (called "nonorthogonal DRS 2" below), and inputs a sum of the reference signal and the perturbation vector as well as a reception signal of the nonorthogonal DRS 2 to the combined DRS estimation part (step S303).

In the combined DRS estimation part 85a, channel estimation is performed by combining three signals including the orthogonal DRS, the nonorthogonal DRS 1 and the nonorthogonal DRS 2, and a channel estimation value ρ is newly calculated (step S304). The value ρ at this time is obtained with higher channel estimation accuracy than when the estimation is made by only using the nonorthogonal DRS 1 and the orthogonal DRS. Thereafter, as shown in FIG. 14, the accuracy of channel estimation can be gradually improved by repeating step 5303 and step 5304 for the number of nonorthogonal DRSs.

With the above method, as the number of estimations increases, the channel estimation accuracy in the estimation of the perturbation vector can be enhanced, and thus it is possible to minimize the possibility of erroneously estimating the perturbation vector in the perturbation vector estimation part 83a.

<First Modified Example>

Although the description of the second embodiment has been given of the case of single-carrier communication, like in the first embodiment, the second embodiment is also applicable to systems performing OFDM in the downlink, the uplink, or both. In a case of performing OFDM in the downlink, the method described in the first embodiment is carried out for each subcarrier.

In the case of performing OFDM communication in the downlink, a BS configuration includes an IFFT part 35 and a GI (Guard Interval) insertion part 37 shown in part (a) of FIG. 11 inserted between the linear filter multiplier 23 and each of the transmitters 25 of FIG. 1. The CRS generator 27 inputs a CRS to the IFFT part 35. The same number of the IFFT part 35 and the GI insertion part 37 as the number of the transmitters 25 are provided, each IFFT part 35 is connected to the linear filter multiplier 23, and the GI insertion parts 37 are respectively connected to the transmitters 25. The IFFT part 35 performs IFFT on the CRS and a signal outputted from the linear filter multiplier 23, generates a baseband digital signal and inputs the baseband digital signal to the GI insertion part 37. The GI insertion part 37 adds a GI to the baseband digital signal and inputs the signal to which the GI is added to each of the transmitters 25. Operations other than those of these two parts are the same as the scheme mentioned above.

In the case of performing OFDM communication in the downlink, an MT configuration includes a GI elimination part 37a and an FFT part 35a shown in part (b) of FIG. 11 inserted between the receiver 51 and the signal separator 53 of FIG. 4A. Operations other than those of these two parts are the same as the scheme mentioned above. The GI elimination part 37a eliminates the GI from the baseband digital signal inputted to the receiver 51 and inputs the signal to the FFT part 35a. The FFT part 35a performs FFT on the baseband digital signal from which the GI is eliminated, calculates a signal in a frequency domain, and inputs the signal in the frequency domain to the signal separator 53.

In the case of performing OFDM communication in the uplink, a BS configuration includes the GI elimination part 37a and the FFT part 35a shown in part (b) of FIG. 11 inserted between each of the receivers 29 and the channel information acquisition part 31 of FIG. 1. The same number of the GI elimination part 37a and the FFT part 35a as the number of the receivers 29 exist, each FFT part 35a is connected to the signal separator 53, and the GI elimination parts 37a are respectively connected to the receivers 29. Operations of the GI elimination part 37a and the FFT part 35a are the same as the operations of the GI elimination part and the FFT part in the above case of performing OFDM communication in the downlink, and thus are omitted.

In the case of performing OFDM communication in the uplink, an MT configuration includes the IFFT part 35 and the GI insertion part 37 shown in part (a) of FIG. 11 inserted between the channel state information generator 61 and the transmitter 63 of FIG. 4A. Operations of the IFFT part 35 and the GI insertion part 37 are the same as the operations of the IFFT part 35 and the GI insertion part 37 in the above case of performing OFDM communication in the uplink, and thus descriptions thereof are omitted.

Moreover, although in part (c) of FIG. 5 the DRSs and the data signals are arranged in the time domain, in the case of performing OFDM communication, the DRSs and the data signals may be arranged in the frequency domain instead of the time domain, or may be arranged in both the time domain and the frequency domain.

For example, frame configurations shown in FIG. 15 to FIG. 17 may be used. In FIG. 15 to FIG. 17, OFDM symbols are sequentially arranged along a horizontal axis in a time domain, and subcarriers are arranged along a vertical axis in a frequency domain. A frame configuration as shown in FIG. 15 may be used, where orthogonal DRSs (DRS-MT1 to DRS-MT4) are frequency-division multiplexed and nonorthogonal DRSs are also frequency-division multiplexed. As in FIG. 16, orthogonal DRSs and nonorthogoal DRSs may be multiplexed in the frequency domain, or as in FIG. 17, they may be multiplexed in both the frequency and time domains. Note that in part (a) of FIG. 16 and part (b) of FIG. 17, the nonorthogonal DRSs are signals to be referred to by all of the MTs, and thus are located at the center of the frame to improve the overall channel estimation accuracy. Note that other than the linear filter calculation method described in this embodiment, the embodiment is applicable to MU-MIMO THP using a linear filter calculation method based on an MMSE criterion described in non-patent document 2, or a method using ordering also described in non-patent document 2 may be used.

Moreover, when the MT notifies the BS of the information estimated on the basis of the CRS, the BS may be notified of quantized values indicating components of H being a matrix representing the channel state. Otherwise, the BS and the MT may share a table (called "Codebook" below) as shown in FIG. 23 in advance, so that the MT can select, based on the CRS, one of 0 to 7 numbers corresponding to a channel directed thereto from among 8 channel information values in FIG. 23, and notify the BS of the selected number. The form of the Codebook is not limited to that shown in FIG. 23, as a matter of course, and other Codebooks may be used.

Additionally, functions according to the MT of the above method may be executed in a processor 2 as shown in FIG. 4A. The processor includes the signal separator, the channel compensator, the CRS channel estimation part, the channel state information generator, the transmitter, the Modulo operation part, the demodulator and the decoder in addition to the receiver and the DRS channel estimation part executing the method of the present application. However, the configuration is not limited to this, and may only include the receiver and the DRS channel estimation part, or may be a configuration including other functions together with the functions.

<Third Embodiment>

In the first and second embodiments, descriptions have been given of cases of single stream communication where the MTs each receive a single data signal at the same time point at the same frequency. The present invention is also applicable to a situation as shown in FIG. 28, where MTs each performing multistream communication are spatially multiplexed.

Hereinbelow, a description will be given of exemplar configurations of a BS and an MT in this case with reference to the drawings. Like in the first embodiment and the second embodiment, firstly basic single-carrier communication will be described, and then a case of expanding the communication to OFDM will be described as a modified example. In addition, although this embodiment will be described by using a case where each MT communicates using M streams at a time, as an example, the embodiment is not limited to this, and the number of communication streams may vary among the MTs.

Operations of the BS and the MT of this embodiment differ from those of the first embodiment and the second embodiment in the following 4 points.

(i) Method of calculating linear filter
(ii) Successive cancellation of interference for every M streams
(iii) Notification of reception filter to MT by BS
(iv) Acquisition of reception filter and multiplication of reception signal by the filter by MT (i) Regarding Method of Calculating Linear Filter FIG. 18 shows an exemplar configuration of a BS of this embodiment. As in the case of FIG. 1 in the first embodiment, FIG. 18 includes a linear filter calculator 33 for calculating a linear filter and interference coefficient information. In addition to the linear filter and the interference coefficient information, the linear filter calculator 33 of this embodiment calculates a reception filter and inputs it to a reception filter information generator 32a. Since this operation of the linear filter calculator 33 is different from the first embodiment, details thereof will be described later.

(ii) Regarding Successive Cancellation of Interference for Every M Streams

Although in the first embodiment and the second embodiment interference is cancelled in single-stream units in the nonlinear spatial multiplexer, interference is cancelled in M-stream units (i.e., in MT units) in this embodiment. For this reason, an interference calculator 41, an interference subtractor 41-2 to N and a Modulo operation part 43-2 to N each calculates signals in M-stream units.

A description will be given of a method for calculating signals in M-stream units by the nonlinear spatial multiplexer 11 shown in FIG. 8. Although in the first and second embodiments each of the connections in FIG. 8 indicates that a single data stream passes therethrough, in this embodiment, M data streams pass through each of the connections. In FIG. 18, MN data streams are inputted from a data signal generator 3. The nonlinear spatial multiplexer 11 (FIG. 8) receiving input of signals from the data signal generator 3 has N connections. This is because each connection includes M data streams.

In the nonlinear spatial multiplexer 11 of this embodiment, M data streams for MT1 are collectively inputted to the interference calculator 41, and then the interference calculator 41 calculates M interference signals corresponding to the M streams of MT2, and inputs them to the interference subtractor 41-2. Subsequently, the interference subtractor 41-2 subtracts the M interference signals respectively corresponding to the streams from the M data streams for MT2, and then inputs the M signals after the subtraction to the Modulo operation part 43-2. The Modulo operation part 43-2 carries out a Modulo operation shown in formula (1) on each of the M signals. The Modulo operation part 43-2 inputs the calculated M signals after the Modulo operation to the interference calculator 41, as well as to the linear filter multiplier 23a.

Thus, while successive interference cancellation is performed for a single stream at a time in the first and second embodiments, the cancellation is performed for M streams at a time in this embodiment. Processing M streams at a time in this manner is a characteristic of the third embodiment.

(iii) Notification of Reception Filter

Moreover, since the BS simultaneously transmits signals for MTs for each M streams, the MT needs to be capable of separating the received M streams. Accordingly, the BS calculates and notifies each MT of a reception filter. The MT multiplies the received signal directed thereto by this reception filter.

In addition, it can be seen from FIG. 18 that the reception filter information generator 32a is newly added to the configuration. The reception filter information generator 32a generates reception filter information and inputs it to a dedicated signal configuration part 21. The dedicated signal configuration part 21 having configured a dedicated signal with nonorthogonal data signals, nonorthogonal DRSs and orthogonal DRSs in former embodiments further configures a dedicated signal by additionally including reception filter information, and inputs the configured dedicated signal to a linear filter multiplier 23a.

A dedicated signal is configured as shown in FIG. 21, for example. The dedicated signal shown in FIG. 21 includes reception filter information for each MT, as well as orthogonal DRSs, nonorthogonal DRSs and data signals for each MT. The orthogonal DRS can be separated through multiplication by the reception filter, and thus those to be transmitted to the same MT can be spatially multiplexed. Similarly, the nonorthogonal DRSs can also be separated through multiplication by the reception filter, and thus as in the case of data signals, DRSs corresponding to all streams for all the MTs can be spatially multiplexed.

(iv) Acquisition of Reception Filter and Multiplication of Reception Signal by the Filter by MT FIG. 19 shows an exemplar configuration of an MT of this embodiment. FIG. 19 shows a configuration of an MT including M antennas. As compared with the configuration of the MT of the first embodiment, the MT of this embodiment includes M of the antennas, receivers and transmitters, which are larger in number than the counterparts in the first embodiment, and a newly-added reception filter multiplier 52a and reception filter acquisition part 52b.

The MT having received a signal including M streams and configured of data signals, nonorthogonal DRSs, orthogonal DRSs and reception filter information firstly acquires a reception filter from the reception filter information in the reception filter acquisition part 52b. The reception filter acquisition part 52b inputs the acquired reception filter to the reception filter multiplier 52a. The reception filter multiplier 52a multiplies, from among the reception signals, the data signals, the nonorthogonal DRSs and the orthogonal DRSs by the reception filter and thus can separate all of the M streams of signals. In addition, the reception filter multiplier 52a inputs the separated M streams of signals to a signal separator 53. Thereafter, the MT can handle each of the streams as an absolutely independent stream.

Operations of the signal separator 53 and the operations thereafter are the same as the first embodiment or the second embodiment. Note, however, that processing such as signal separation and channel estimation is performed for each of the separated M streams. Moreover, as for a frame receiving a CRS, the reception filter multiplier 52a does not multiply the frame by any filter and inputs it as it is to the signal separator 53.

The four points described above are the changes made in this embodiment as compared with the first embodiment and the second embodiment. A description will be given below of a method of the linear filter calculator 52a for calculating a linear filter, interference coefficient information and a reception filter.

The linear filter calculator 33 according to this embodiment carries out 4 processes including i) calculation of Null Space, calculation of MT specific filter calculation of linear filter, and iv) calculation of interference coefficient information. In the end, the linear filter calculator 33 inputs the linear filter to the linear filter multiplier 33, the interference coefficient information to the interference calculator 41, and the reception filter to the reception filter information generator 32a.

Here, to simplify the description of the operation of the linear filter calculator 33, a description will firstly be given of a situation including 2 MTs each having 2 antennas (M=2, N=2) and a BS having 4 antennas (MN=4).

i) Calculation of Null Space

A linear filter by which a signal for MT2 is multiplied and which prevents signals for MT2 from reaching MT1 as shown in FIG. 20 is called Null Space. Complex gain of channels between each transmission antenna of the BS and a reception antenna of the k-th MT is expressed as a 2×4 matrix $H_k$. In this description, k is the number of the MT after the ordering. Here, the entire channel matrix is expressed as:

[Formula 17]

$$H = \begin{bmatrix} H_1 \\ H_2 \end{bmatrix} = \begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix}. \quad (17)$$

Here, to ensure consistency with a later mentioned case including 3 or more MTs, $H_1$ is replaced with a symbol $\hat{H}_2$. $\hat{H}_2$ represents a matrix obtained by eliminating $H_2$ from the entire channel matrix H, and when the number of MTs is 2, $H_1 = \hat{H}_2$. Then, $\hat{H}_2$ is subjected to singular value decomposition. After this operation, $\hat{H}_2$ is expressed as:

[Formula 18]

$$\hat{H}_2 = \begin{bmatrix} \hat{U}_{2,11} & \hat{U}_{2,12} \\ \hat{U}_{2,21} & \hat{U}_{2,22} \end{bmatrix} \begin{bmatrix} \hat{\Sigma}_{2,1} & 0 & 0 & 0 \\ 0 & \hat{\Sigma}_{2,2} & 0 & 0 \end{bmatrix} \begin{bmatrix} \hat{V}_{2,11} & \hat{V}_{2,12} & \hat{V}_{2,13} & \hat{V}_{2,14} \\ \hat{V}_{2,21} & \hat{V}_{2,22} & \hat{V}_{2,23} & \hat{V}_{2,24} \\ \hat{V}_{2,31} & \hat{V}_{2,32} & \hat{V}_{2,33} & \hat{V}_{2,34} \\ \hat{V}_{2,41} & \hat{V}_{2,42} & \hat{V}_{2,43} & \hat{V}_{2,44} \end{bmatrix}. \quad (18)$$

Here, on the right side of formula (18), each of the leftmost matrix and the third matrix from the left are a unitary matrix. In addition, in the second matrix from the left, only the components of first row first column and second row second column are positive real numbers. An Hermitian conjugate of a matrix corresponding to the third and fourth rows of the third matrix from the left is defined as:

[Formula 19]

$$\hat{V}_2^{ker} = \begin{bmatrix} \hat{V}_{2,31} & \hat{V}_{2,32} & \hat{V}_{2,33} & \hat{V}_{2,34} \\ \hat{V}_{2,41} & \hat{V}_{2,42} & \hat{V}_{2,43} & \hat{V}_{2,44} \end{bmatrix}^H. \quad (19)$$

Here, a signal obtained by multiplying a modulated signal $s=(s_1^t, s_2^t)_t$ by $\hat{V}_2^{ker}$ as a linear filter is expressed as:

[Formula 20]

$$H_1 \hat{V}_2^{ker} s = \hat{H}_2 \hat{V}_2^{ker} s \quad (20)$$

$$= \begin{bmatrix} \hat{U}_{2,11} & \hat{U}_{2,12} \\ \hat{U}_{2,21} & \hat{U}_{2,22} \end{bmatrix} \begin{bmatrix} \hat{\Sigma}_{2,1} & 0 & 0 & 0 \\ 0 & \hat{\Sigma}_{2,2} & 0 & 0 \end{bmatrix}$$

$$\begin{bmatrix} \hat{V}_{2,11} & \hat{V}_{2,12} & \hat{V}_{2,13} & \hat{V}_{2,14} \\ \hat{V}_{2,21} & \hat{V}_{2,22} & \hat{V}_{2,23} & \hat{V}_{2,24} \\ \hat{V}_{2,31} & \hat{V}_{2,32} & \hat{V}_{2,33} & \hat{V}_{2,34} \\ \hat{V}_{2,41} & \hat{V}_{2,42} & \hat{V}_{2,43} & \hat{V}_{2,44} \end{bmatrix} \begin{bmatrix} \hat{V}^*_{2,31} & \hat{V}^*_{2,41} \\ \hat{V}^*_{2,32} & \hat{V}^*_{2,42} \\ \hat{V}^*_{2,33} & \hat{V}^*_{2,43} \\ \hat{V}^*_{2,34} & \hat{V}^*_{2,44} \end{bmatrix} \begin{bmatrix} s_1 \\ s_2 \end{bmatrix}$$

$$= \begin{bmatrix} \hat{U}_{2,11} & \hat{U}_{2,12} \\ \hat{U}_{2,21} & \hat{U}_{2,22} \end{bmatrix} \begin{bmatrix} \hat{\Sigma}_{2,1} & 0 & 0 & 0 \\ 0 & \hat{\Sigma}_{2,2} & 0 & 0 \end{bmatrix} \begin{bmatrix} 0 & 0 \\ 0 & 0 \\ 1 & 0 \\ 0 & 1 \end{bmatrix} \begin{bmatrix} s_1 \\ s_2 \end{bmatrix}$$

$$= \begin{bmatrix} \hat{U}_{2,11} & \hat{U}_{2,12} \\ \hat{U}_{2,21} & \hat{U}_{2,22} \end{bmatrix} \begin{bmatrix} 0 & 0 \\ 0 & 0 \end{bmatrix} \begin{bmatrix} s_1 \\ s_2 \end{bmatrix} = \begin{bmatrix} 0 \\ 0 \end{bmatrix}.$$

The resultant signal never reaches MT1 having the channel $H_1$. In other words, Null of the signal multiplied by $\hat{V}_2^{ker}$ as a linear filter is directed completely toward the channel $H_1$. To be precise, $\hat{V}_2^{ker}$ of this matrix represents a Null Space of the channel $\hat{H}_2$. Accordingly, a signal transmitted after multiplying a modulated signal $s=(s_1{}^t, s_2{}^t)^t$ by a linear filter $\hat{V}_2^{ker}$, neither reaches MT1 nor interferes with MT1. For this reason, if a signal for MT2 is multiplied by this linear filter $\hat{V}_2^{ker}$, the signal for MT2 can be prevented from reaching MT1 as interference.

ii) Calculation of MT Specific Filter

In the state where the signal for MT2 is multiplied by the linear filter $\hat{V}_2^{ker}$, a channel of MT2 can be considered as an SU-MIMO channel ($H_2\hat{V}_2^{ker}$) as indicated by arrows directed from the BS to MT2 in FIG. 20. To calculate an MT specific filter means to calculate an appropriate filter by which this SU-MIMO channel should be multiplied on the BS side. Moreover, an MT specific filter is also calculated for a signal for MT1. It is not a problem that the signal for MT1 interferes with MT2 since the signal for MT1 is eliminated later by the interference subtractor 41-2 and the Modulo operation part 43-2. Hence, multiplication by a linear filter like $\hat{V}_2^{ker}$ for MT2 is unnecessary, and it suffices that only the MT specific filter for the SU-MIMO channel ($H_1$) between only the BS and the MT1 is calculated.

The specific filter for MT2 is obtained by performing singular value decomposition again on the channel $H_2$ for MT2 multiplied by $\hat{V}_2^{ker}$ obtained in formula (18) ($H_2\hat{V}_2^{ker}$). Since $H_2\hat{V}_2^{ker}$ is a 2×2 matrix, the following can be obtained by subjecting it to singular value decomposition.

[Formula 21]

$$H_2\hat{V}_2^{ker} = \begin{bmatrix} U_{2,11} & U_{2,12} \\ U_{2,21} & U_{2,22} \end{bmatrix} \begin{bmatrix} \Sigma_{2,1} & 0 \\ 0 & \Sigma_{2,2} \end{bmatrix} \begin{bmatrix} V_{2,11} & V_{2,12} \\ V_{2,21} & V_{2,22} \end{bmatrix}. \quad (21)$$

An Hermitian conjugate of the rightmost matrix of the right side of formula (21) is defined as an MT specific filter $V_2^{Im}$.

In addition, as for signals for MT1, an MT specific filter can be obtained by performing singular value decomposition on $H_1$.

[Formula 22]

$$H_1 = \begin{bmatrix} U_{1,11} & U_{1,12} \\ U_{1,21} & U_{1,22} \end{bmatrix} \begin{bmatrix} \Sigma_{1,1} & 0 \\ 0 & \Sigma_{1,2} \end{bmatrix} \begin{bmatrix} V_{1,11} & V_{1,12} & V_{1,13} & V_{1,14} \\ V_{1,21} & V_{1,22} & V_{1,23} & V_{1,24} \end{bmatrix}. \quad (22)$$

An Hermitian conjugate of the rightmost matrix of the right side of formula (22) is defined as an MT specific filter $V_1^{Im}$.

iii) Calculation of Linear Filter

The linear filters ($\hat{V}_2^{ker}, V_k^{Im}$ (k=1,2)) obtained in formulae (19), (21) and (22) by which the signals for MT1 and MT2 should by multiplied are collectively defined as the following linear filter:

[Formula 23]

$$P=[V_1^{Im}, \hat{V}_2^{ker}V_2^{Im}] \quad (23)$$

Through multiplication by this linear filter P, signals for MT1 can be multiplied by the optimal MT specific filter for an SU-MIMO from the BS to MT1, and at the same time signals for MT2 can be multiplied by the optimal MT specific filter under the limitation that the Null is directed toward MT1. This P corresponds to Q in the first embodiment, and the filter multiplier inputs this P to the linear filter multiplier.

iv) Calculation of Interference Coefficient Filter

HP considered as an equivalent channel is expressed as:

[Formula 24]

$$HP = T = \begin{bmatrix} T_{11} & 0 \\ T_{21} & T_{22} \end{bmatrix}. \quad (24)$$

Here, $T_{11}$, $T_{21}$ and $T_{22}$ are 2×2 matrixes. $T_{11}$ and $T_{22}$ indicate channel states when signals transmitted from the BS to MT1 and MT2 reach the correct MTs respectively. In addition, $T_{21}$ indicates a channel state when a signal transmitted from the BS to MT1 reaches MT2 as interference. The right upper component of formula (24) being 0 indicates that a signal for MT2 does not reach MT1 as interference.

The BS calculates an interference coefficient filter using this equivalent channel T. An interference coefficient filter is a filter for calculating an interference component which remains after channel compensation by MT2, by use of the equivalent channel T. $T_{21}$ being a part of the equivalent channel T represents the channel through which the signal for MT1 which interferes with MT2 passes. However, since T represents interference components before channel compensation by MT2, in this scheme, a channel for the interference signal after the channel compensation needs to be calculated.

When only the channels for the data signals are taken out, the channels are expressed as:

[Formula 25]

$$B = \begin{bmatrix} T_{11} & 0 \\ 0 & T_{22} \end{bmatrix}. \quad (25)$$

This corresponds to an expanded case of A of the first embodiment including multiple reception antennas. Channel compensation is performed by multiplying by an inverse matrix of B, whereby the interference component is expressed as:

[Formula 26]

$$B^{-1}T - I = \begin{bmatrix} 0 & 0 \\ T_{22}^{-1}T_{21} & 0 \end{bmatrix}. \quad (26)$$

The unit matrix I is subtracted in the left side of formula (26) to eliminate the components for data signals.

With these calculations, interference coefficient information $B^{-1}T-I$ and a linear filter P can be obtained. Additionally, the reception filter is the Hermitian conjugate of the leftmost matrix of the right side of formula (2-6) and formula (2-7). That is to say,

[Formula 27]

$$U_1 = \begin{bmatrix} U_{1,11} & U_{1,12} \\ U_{1,21} & U_{1,22} \end{bmatrix}^H, U_2 = \begin{bmatrix} U_{2,11} & U_{2,12} \\ U_{2,21} & U_{2,22} \end{bmatrix}^H. \quad (27)$$

The linear filter calculator 33 inputs this reception filter to the reception filter information generator 32a.

Hereinabove, the description has been given of the case including the 2 MTs each having 2 antennas, and the BS having 4 antennas. Next, the operation of the linear filter calculator 33 is described by use of a generalized case including N of the MTs each having M antennas.

i) Calculation of Null Space

Complex gain of channels for each antenna of the BS to an antenna of the k-th MT is expressed as an M×MN matrix $H_k$. In this description, k is the number of the MT after the ordering. To be specific, an MT corresponding to $H_1$ is an MT which does not correspond to THP, and the rest of the MTs are MTs corresponding to THP. The entire channel matrix is expressed as:

[Formula 28]

$$H = [H_1', H_2', \ldots, H_N']' \quad (28)$$

A matrix of the first to k−1 th channels taken out of this entire channel matrix is expressed as:

[Formula 29]

$$\hat{H} = [H_1', H_2', \ldots, H_{k-1}']' \quad (29)$$

This matrix $\hat{H}_k$ is an M×Mk matrix. Thereafter, $\hat{H}_k$ is subjected to singular value decomposition.

[Formula 30]

$$\hat{H}_k = \hat{U}_k^H \hat{\Sigma}_k [\hat{V}_k^{Im}, \hat{V}_k^{ker}]^H \quad (30)$$

Here, $\hat{V}_k^{Im}$ is defined as an MN×M(k−1) matrix, and $\hat{V}_k^{ker}$ is defined as an MN×M(N−k+1) matrix. Since a rank of $\hat{H}_k$ is M(k−1) at most, $\hat{V}_k^{ker}$ obtained by eliminating the first M(k−1) columns of $[\hat{V}_k^{Im}, \hat{V}_k^{ker}]$ corresponds to the Null Space. In other words, the space that the column vector of $\hat{V}_k^{ker}$ is referred to as Null Space. This means that when a vector obtained by multiplying an arbitrary M(N−k) dimension vector x by $\hat{V}_k^{ker}$ from the left is further multiplied by $\hat{H}_k$ from the left, the result is always 0. Considering that $\hat{H}_k$ is a matrix representing channels corresponding to first to (k−1)th MTs, a signal transmitted after being multiplied by the filter $\hat{V}_k^{ker}$ in the BS does not interfere with other signals when passing through the channels $\hat{H}_k$ corresponding to the first to (k−1)-th MTs. This is a generalization of formula (20).

ii) Calculation of MT Specific Filter

Next, optimal precoding is performed for every N signals for MTs. $(H_k\hat{V}_k^{ker})$ obtained by multiplying a channel $H_k$ corresponding to the k-th MT by $\hat{V}_k^{ker}$ found in formula (2-3) is subjected to singular value decomposition again.

[Formula 31]

$$H_k\hat{V}_k^{ker} = U_k \Sigma_k [V_k^{Im}, V_k^{ker}]^H \quad (31)$$

Since $H_k\hat{V}_k^{ker}$ is an M×M(N−k+1) matrix, $H_k\hat{V}_k^{ker}$ is M rank at most. First M columns of $[\hat{V}_k^{Im}, \hat{V}_k^{ker}]$ are defined as MT specific filters $\hat{V}_k^{Im}$. Moreover, $\hat{V}_k^{Im}$ is an M(N−k)×M matrix.

iii) Calculation of Linear Filter

A linear filter is expressed as follows by using $\hat{V}_k^{Im}$ and $\hat{V}_k^{ker}$ obtained in formulae (30) and (31):

[Formula 32]

$$P = [\hat{V}_1^{ker}V_1^{Im}, \hat{V}_2^{ker}V_2^{Im}, \ldots, \hat{V}_N^{ker}V_N^{Im}] \quad (32)$$

This P corresponds to Q in the first embodiment, and the filter multiplier inputs this P to the linear filter multiplier.

iv) Calculation of Interference Coefficient Filter

HP considered as an equivalent channel is expressed as:

[Formula 33]

$$HP = T = \begin{bmatrix} T_{11} & 0 & \ldots & 0 \\ T_{21} & T_{22} & \ddots & \vdots \\ \vdots & & \ddots & 0 \\ T_{N1} & \ldots & & T_{NN} \end{bmatrix}. \quad (33)$$

Here, $T_{ik}$ is an M×M matrix, and is a channel matrix that a signal for the k-th MT can be considered to pass through when it reaches the i-th MT. $T_{ik}$ (i=k) represents a channel through which a signal transmitted from the BS side to each MT reaches the correct MT, and $T_{ik}$ (i≠k) represents a channel through which a signal for a different MT reaches an MT as interference. Although this equivalent channel corresponds to $R^H$ of the first embodiment, $R^H$ of the first embodiment is a complete lower triangular matrix, whereas in this embodiment T is a lower triangular matrix except for a matrix $T_{ii}$ in a diagonal portion representing a channel for data signals. In other words, T is triangulated for M×M matrix block units. When only the channels for the data signals are taken out, the channels are expressed as:

[Formula 34]

$$B = \begin{bmatrix} T_{11} & 0 & \ldots & 0 \\ 0 & T_{22} & \ddots & \vdots \\ \vdots & & \ddots & 0 \\ 0 & \ldots & 0 & T_{NN} \end{bmatrix}. \quad (34)$$

This corresponds to an expanded case of A of the first embodiment including multiple reception antennas. As in the first embodiment, an interference coefficient filter is calculated as follows, to calculate a signal for offsetting interference that the MT undergoes after data signals have passed through channels expressed by formula (33):

[Formula 35]

$$B^{-1}T - I = \begin{bmatrix} 0 & 0 & \cdots & 0 \\ T_{22}^{-1}T_{21} & 0 & \ddots & \vdots \\ \vdots & \ddots & \ddots & 0 \\ T_{NN}^{-1}T_{N1} & \cdots & T_{NN}^{-1}T_{N(N-1)} & 0 \end{bmatrix}. \quad (35)$$

The interference coefficient filter thus calculated is inputted to the interference calculator 41. An Hermitian conjugate $U^H_k$ of $U_k$ in formula (31) is the reception filter for the k-th MT. Accordingly, the linear filter calculator 33 inputs this $U^H_k$ to the reception filter information generator 32a. The above is the operations of the linear filter calculator 33 in a generalized case.

Moreover, based on formulae (30) and (31), an equivalent channel including multiplication of the reception filter is expressed as:

[Formula 36]

$$U_k H_k \hat{V}_k^{ker} V_k^{lm} = U_k U_k^H \Sigma_k [V_k^{lm}, V_k^{ker}]^H V_k^{lm} = \Sigma_k. \quad (36)$$

Specifically, components of first row first column, second row second column, ... M-th row M-th column of $\Sigma_k$ represent the equivalent channels of the respective streams including multiplication of the reception filters. The channel compensator 55 performs channel compensation by estimating the above components from the DRSs and multiplying the modulated signals by the components.

<First Modified Example>

Although the description of the third embodiment has been given of the case of single-carrier communication, like in the first embodiment, the third embodiment is also applicable to systems performing OFDM in the downlink, the uplink, or both.

In the case of performing OFDM communication in the downlink, a BS configuration includes an IFFT part 35 and a GI (Guard Interval) insertion part 37 shown in part (a) of FIG. 11 inserted between the linear filter multiplier 23a and each of the transmitters 25 of FIG. 18. The CRS generator 27 inputs a CRS to the IFFT part 35. MN, which is the same as the number of transmitters 25, of the IFFT parts 35 and GI insertion parts 37 exist, each IFFT part 35 is connected to the linear filter multiplier 23a, and the GI insertion parts 37 are respectively connected to the transmitters 25. The IFFT part 35 performs IFFT on the CRS and a signal outputted from the linear filter multiplier 23a, generates a baseband digital signal and inputs the baseband digital signal to the GI insertion part 37. The GI insertion part 37 adds a GI to the baseband digital signal and inputs the signal to which the GI is added to each of the transmitters 25. Operations other than those of these two parts are the same as the scheme mentioned above.

In the case of performing OFDM communication in the downlink, an MT configuration includes a GI elimination part 37a and an FFT part 35a shown in part (b) of FIG. 11 inserted between the receiver 51 and the reception filter multiplier 52a of FIG. 19. Operations other than those of these two parts are the same as the scheme mentioned above. The GI elimination part 37a eliminates the GI from the baseband digital signal inputted to the receiver 51 and inputs the signal to the FFT part 35a. The FFT part 35a performs FFT on the baseband digital signal from which the GI is eliminated, calculates a signal in a frequency domain, and inputs the signal in the frequency domain to the reception filter multiplier 52a.

In the case of performing OFDM communication in the uplink, a BS configuration includes the GI elimination part 37a and the FFT part 35a shown in part (b) of FIG. 11 inserted between each of the receivers 29 and the channel information acquisition part 31 of FIG. 1. MN, which is the same as the number of the receivers 25, of the GI elimination part 37a and the FFT part 35a exist, each FFT part 35a is connected to the channel information acquisition part 31, and the GI elimination parts 37a are respectively connected to the receivers 29. Operations of the GI elimination part 37a and the FFT part 35a are the same as the operations of the GI elimination part 37a and the FFT part 35a in the above case of performing OFDM communication in the downlink, and thus are omitted.

In the case of performing OFDM communication in the uplink, an MT configuration includes the IFFT part 35 and the GI insertion part 37 shown in part (a) of FIG. 11 inserted between the channel state information generator 61 and the transmitter 63 of FIG. 19. Operations of the IFFT part 35 and the GI insertion part 37 are the same as the operations of the IFFT part and the GI insertion part in the above case of performing OFDM communication in the uplink, and thus descriptions thereof are omitted.

Moreover, although in FIG. 21 the DRSs and the data signals are arranged in the time domain, in the case of performing OFDM communication, the DRSs and the data signals may be arranged in the frequency domain instead of the time domain, or may be arranged in both the time domain and the frequency domain. For example, a frame configuration may be used, where orthogonal DRSs (DRS-MT1 to DRS-MT4) are frequency-division multiplexed and nonorthogonal DRSs are also frequency-division multiplexed. Otherwise, a method of multiplexing the orthogonal DRSs and nonorthogoal DRSs in both the frequency and time domains may be employed.

<Second Modified Example>

In this embodiment, as mentioned in iii), a description has been given of a method in which the BS transmits a reception filter and the NIT uses the reception filter to separate DRSs and data signals into the respective streams. This second modified example describes a method in which the MT separates the data signals into the respective streams without the transmission of the information related to the reception filter by the BS.

Firstly, a frame is configured as shown in FIG. 22. As compared to FIG. 21, in the modified example in FIG. 22, instead of transmitting the reception filters, the BS transmits DRS for the respective MTs for each stream by an orthogonal radio resource. In FIG. 22, orthogonal DRSs corresponding to stream 1 and stream 2 for MT1 (DRS-MT1, DRS-MT2) are transmitted, and orthogonal DRSs corresponding to stream 3 and stream 4 for MT2 are similarly transmitted.

A BS according to this embodiment is configured by eliminating the reception filter information generator 32a from that the configuration shown in FIG. 18. An MT according to this embodiment is configured by eliminating the reception filter multiplier 52a and the reception filter acquisition part 53b from the configuration shown in FIG. 19. Each MT can estimate an equivalent channel matrix $U_k \Sigma_k$ by receiving DRSs by a DRS channel estimation part 65. Data signals are received by the MT through the same equivalent channel matrix $U_k \Sigma_k$. For this reason, a channel compensator 55 of the MT can multiply the data signal by an inverse matrix of this matrix, separate the signal into streams, and normalize the amplitude of the data signal. The MT inputs the signal calculated by the channel estimation part 55 to a Modulo operation part 67.

Note that other than the linear filter calculation method described in this embodiment, the embodiment is applicable to MU-MIMO THP using a linear filter based on an MMSE criterion, or a method using ordering described in non-patent document 3 may be used.

Moreover, when the MT notifies the BS of the information estimated on the basis of the CRS, the BS may be notified of quantized values indicating components of H being a matrix representing the channel state. Otherwise, the BS and the MT may share a table (called "Codebook" below) as shown in FIG. 23 in advance, so that the MT can select, based on the CRS, one of 0 to 7 numbers corresponding to a channel directed thereto from among 8 channel information values in FIG. 23, and notify the BS of the selected number. The form of the Codebook is not limited to that shown in FIG. 23, as a matter of course, and other Codebooks may be used.

Furthermore, functions according to the BS of the above method may be executed in a processor 1 as shown in FIG. 18. The processor 1 includes the receivers, the channel information acquisition part, the CRS generator, the reception filter information generator and the data signal generator in addition to the DRS generator, the nonlinear spatial multiplexer, and the transmitters executing the method of the present application. However, the configuration is not limited to this, and may only include the DRS generator, the nonlinear spatial multiplexer and the transmitters, or may be a configuration including other functions together in addition to the functions.

Additionally, functions according to the MT of the above method may be executed in a processor 2 as shown in FIG. 19. The processor includes the signal separator, the channel compensator, the CRS channel estimation part, the channel state information generator, the transmitter, the Modulo operation part, the demodulator, the decoder, the reception filter multiplier and the reception filter acquisition part in addition to the receiver and the DRS channel estimation part executing the method of the present application. However, the configuration is not limited to this, and may only include the receiver and the DRS channel estimation part, or may be a configuration including other functions together in addition to the functions. Note that while the transmission mode determination part in this description is equivalent to the transmission mode acquisition part, other configurations may be employed.

Hereinbelow, points common to all of the above embodiments will be described.

<Description Common to all Embodiments>

Although for convenience of explanation the number of antennas included in the base station (BS) and mobile terminal (MT) in each of the above embodiments is matched with the number of data streams with which the MT communicates, the number of antennas that the MT physically has may differ from the number mentioned in the description. For example, if an MT receives signals by physically 2 antennas but is designed to combine the received signals into a single signal, the description of this invention considers the MT to have a single antenna for convenience.

Note that the present invention is not necessarily used in all DL MU-MIMO communications using THP, but may be used partially according to the reception quality, such as transmitting DRSs by the method of this invention only to the MTs having high received SNR, for example. Moreover, the invention may be partially used according not only to the reception quality but to the traveling speed, modulation scheme, rate of encoding or the like of an MT.

For example, an MT having high SNR often uses Adaptive Modulation and Coding (AMC) and employs high-level modulation schemes such as 16 QAM and 64 QAM. Since distances between signal points are short in high-level modulation schemes, high channel estimation is required. Accordingly, when received SNR is high, or when communication is performed by use of a high-level modulation scheme, the present invention can be advantageously used to improve the channel estimation accuracy by using nonorthogonal DRS in addition to orthogonal DRS. The present invention is considered to function advantageously when SNR is high, since there are less erroneous estimations of a perturbation vector in an orthogonal DRS.

Further, by using the present invention when the level of the modulation scheme is 64 QAM or more and using a conventional technique such as transmitting only orthogonal DRSs when the level is less than 64 QAM, it is possible to eliminate the need to transmit additional control information on which of the methods of two DRS transmission methods, this invention or the conventional technique, is used. This is because an MT can determine which of the DRS transmission methods is used, based on the modulation scheme in use.

Each of programs operating on the mobile terminal and on the base station according to this invention is a program (program causing a computer to function) for controlling a CPU or the like to implement the functions of the above embodiments related to the present invention. Information handled by these devices is temporarily accumulated in a RAM at the time of processing by the device, and then is stored in various ROMs and HDDs to be read, modified or written to by a CPU according to need. As the recording medium for storing the program, any of a semiconductor medium (such as a ROM, a nonvolatile memory card and the like), an optical recording medium (such as a DVD, an MO, an MD, a CD, a BD and the like), a magnetic recording medium (such as a magnetic tape, a flexible disc and the like) may be used, for example. In addition, the functions of the above embodiment are implemented not only by executing a loaded program, but also the functions of this invention may be implemented by performing processing in cooperation with an operating system, another application program or the like based on instructions from the program.

Moreover, if the program is to be distributed in a market, the program may be stored in a portable recording medium for distribution, or may be transferred to a server computer connected via a network such as the Internet. In this case, a memory of the server computer is included in the invention. Additionally, part of or all of the mobile terminal and the base station of the above embodiments may be implemented as an LSI which is typically an integrated circuit. Each of functional blocks of the mobile terminal and the base station may each be implemented as a processor, or part of or all of the functional blocks may be integrated as a processor. Moreover, the method of fabricating the integrated circuit may be implemented not only with LSI, but may be implemented with a dedicated circuit, or a general-purpose processor. If a technique for integrated circuit fabrication substituting LSI is developed with advancement of semiconductor technology, an integrated circuit fabricated by the technique may also be used.

Hereinabove, embodiments of this invention have been described in detail with reference to the drawings. However, concrete configurations are not limited to the embodiments, and design and the like that do not depart from the gist of the invention are included in the scope of claims.

Industrial Applicability

The present invention is applicable to a communication device.

All publications, patent and patent applications cited in this description are incorporated herein by reference in their entirety.

Explanation of Reference Numerals

A . . . base station, 1 . . . processor, 3 . . . data signal generator, 5 . . . encoder, 7 . . . demodulator, 11 . . . nonlinear spatial multiplexer, 15 . . . DRS generator, 17 . . . orthogonal multiplexer, 21 . . . dedicated signal configuration part, 23 . . . linear filter multiplier, 25 . . . transmitter, AT . . . antenna, 27 . . . CRS generator, 29 . . . receiver, 31 . . . channel information acquisition part, 33 . . . linear filter calculator, B . . . mobile terminal (MT), 51 . . . receiver, 53 . . . signal separator, 55 . . . channel compensator, 57 . . . Modulo operation part, 61 . . . channel state information generator, 63 . . . transmitter, 65 . . . DRS channel estimation part, 71 . . . demodulator, 73 . . . decoder.

The invention claimed is:

1. A transmission device, including a plurality of antennas, for transmitting signals in a same channel at the same time point to a plurality of reception devices, comprising:

a DRS generator configured to generate DRSs (dedicated reference signals) for the respective reception devices;

a nonlinear spatial multiplexer configured to generate a nonorthogonal DRS by use of a first group of DRSs including at least one of the DRSs;

a transmitter configured to transmit a signal containing at least the nonorthogonal DRS;

an orthogonal multiplexer configured to generate an orthogonal DRS using a second group of DRSs including at least one of the DRSs, wherein the transmitter is configured to transmit a signal containing at least one of the nonorthogoal DRSs and at least one of the orthogonal DRSs;

a data signal generator configured to generate data signals for the reception devices, wherein the nonlinear spatial multiplexer is configured to perform nonlinear spatial multiplexing on the data signals, and the transmitter is configured to transmit the data signals after the nonlinear spatial multiplexing to the plurality of reception devices; and a linear filter calculator configured to calculate a linear filter and interference coefficient information according to channel state information, wherein the nonlinear spatial multiplexer comprises:

an interference calculator configured to calculate interference that each of the reception devices undergoes by use of the data signal or some of the DRSs of the first group, an interference subtractor configured to subtract the interference from each of the data signals for each of the reception devices or from the DRSs of the first group, and a Modulo operation part configured to carry out a Modulo operation on at least one of the data signals after the subtraction of the interference by the interference subtractor or at least one of the DRSs of the first group after the subtraction of the interference by the interference subtractor.

2. A reception device comprising:

a receiver configured to receive a nonorthogonal DRS (dedicated reference signal) in which a plurality of DRSs for respective reception devices are spatially multiplexed; and a channel estimation part configured to perform channel estimation by use of at least the nonorthogonal DRS;

wherein the receiver is further configured to receive an orthogonal DRS, and the channel estimation part comprises a channel estimator configured to perform channel estimation by use of at least the orthogonal DRS and the nonorthogonal DRS;

wherein the channel estimation part comprises:

an orthogonal DRS estimator configured to perform first channel estimation by use of the orthogonal DRS, and a perturbation vector estimator configured to estimate, by use of a result of the first channel estimation and the nonorthogonal DRS, a perturbation vector added to the nonorthogonal DRS.

3. The reception device according to claim 2, wherein the channel estimation part comprises a combined DRS estimator configured to calculate a channel estimation value by use of the nonorthogonal DRS, the perturbation vector and the orthogonal DRS.

4. The reception device according to claim 2, wherein:

the receiver is configured to receive the orthogonal DRS and a plurality of nonorthogonal DRSs; and the channel estimation part comprises:

an orthogonal DRS estimator configured to calculate the first channel estimation value by use of the orthogonal DRS;

a perturbation vector estimator configured to estimate perturbation vectors added to some of the plurality of nonorthogonal DRSs by use of the first channel estimation value and the some of the nonorthogonal DRSs; and a combined DRS estimator configured to calculate a channel estimation value by use of the some of the nonorthogonal DRSs, the perturbation vector and the orthogonal DRS.

5. New The reception device according to claim 4, wherein the perturbation vector estimator is configured to estimate a perturbation vector added to a nonorthogonal DRS other than the some of the nonorthogonal DRSs, by use of the channel estimation value and the nonorthogonal DRS other than the some of the nonorthogonal DRSs.

6. A method for transmitting signals in the same channel at the same time point to a plurality of reception devices through a plurality of transmission antennas, the method comprising the steps of:

generating DRSs (dedicated reference signals) for the respective reception devices;

generating a nonorthogonal DRS by use of a first group of DRSs including at least one of the DRSs;

transmitting a signal containing at least the nonorthogonal DRS;

generating an orthogonal DRS using a second group of DRSs including at least one of the DRSs, wherein the transmitting step is configured to transmit a signal containing at least one of the nonorthogoal DRSs and at least one of the orthogonal DRSs;

generating data signals for the reception devices, wherein the nonlinear spatial multiplexing step performing nonlinear spatial multiplexing on the data signals, and transmitting the data signals after the nonlinear spatial multiplexing to the plurality of reception devices; and calculating a linear filter and interference coefficient information according to channel state information, wherein the nonlinear spatial multiplexing step comprises:

calculating interference that each of the reception devices undergoes by use of the data signal or some of the DRSs of the first group, subtracting the interference from each of the data signals for each of the reception devices or from the DRSs of the first group, and carrying out a Modulo operation on at least one of the data signals of the subtraction of the interference by the interference subtracting step or at least one of the DRSs of the first group after the subtraction of the interference by the interference subtracting step.

7. A method for transmitting signals in the same channel at the same time point to a plurality of reception devices through a plurality of transmission antennas, the method comprising the steps of:

receiving a nonorthogonal DRS (dedicated reference signal) in which a plurality of DRSs for respective reception devices are spatially multiplexed; and performing channel estimation by use of at least the nonorthogonal DRS;

wherein the receiving step is further configured to receive an orthogonal DRS, and the channel estimation step comprises performing channel estimation by use of at least the orthogonal DRS and the nonorthogonal DRS;

wherein the channel estimation step comprises:

performing first channel estimation by use of the orthogonal DRS, and a perturbation vector estimator configured to estimate, by use of a result of the first channel estimation and the nonorthogonal DRS, a perturbation vector added to the nonorthogonal DRS.

8. A non-transitory computer-readable medium having computer-executable instructions embodied thereon to execute the method of claim 6.

9. A processor used in a transmission device including a plurality of antennas for transmitting signals in the same channel at the same time point to a plurality of reception devices, the processor comprising:

a DRS generator configured to generate DRSs (dedicated reference signals) for the respective reception devices;

a nonlinear spatial multiplexer configured to generate a nonorthogonal DRS by use of a first group of DRSs including at least one of the DRSs;

a transmitter configured to transmit a signal containing at least the nonorthogonal DRS; an orthogonal multiplexer configured to generate an orthogonal DRS using a second group of DRSs including at least one of the DRSs, wherein the transmitter is configured to transmit a signal containing at least one of the nonorthogoal DRSs and at least one of the orthogonal DRSs;

a data signal generator configured to generate data signals for the reception devices, wherein the nonlinear spatial multiplexer is configured to perform nonlinear spatial multiplexing on the data signals, and the transmitter is configured to transmit the data signals after the nonlinear spatial multiplexing to the plurality of reception devices; and a linear filter calculator configured to calculate a linear filter and interference coefficient information according to channel state information, wherein the nonlinear spatial multiplexer comprises:

an interference calculator configured to calculate interference that each of the reception devices undergoes by use of the data signal or some of the DRSs of the first group, an interference subtractor configured to subtract the interference from each of the data signals for each of the reception devices or from the DR.Ss of the first group, and a Modulo operation part configured to carry out a Modulo operation on at least one of the data signals after the subtraction of the interference by the interference subtractor or at least one of the DRSs of the first group after the subtraction of the interference by the interference subtractor.

10. A processor used in a transmission device including a plurality of antennas for transmitting signals in, the same channel at the same time point to a plurality of reception devices, the processor comprising:

a DRS generator configured to generate DRSs (dedicated reference signals) for the respective reception devices;

a channel estimation part configured to perform channel estimation by use of at least the nonorthogonal DRS;

wherein the receiver is further configured to receive an orthogonal DRS, and the channel estimation part comprises a channel estimator configured to perform channel estimation by use of at least the orthogonal DRS and the nonorthogonal DRS;

wherein the channel estimation part comprises:

an orthogonal DRS estimator configured to perform first channel estimation by use of the orthogonal DRS, and a perturbation vector estimator configured to estimate, by use of a result of the first channel estimation and the nonorthogonal DRS, a perturbation vector added to the nonorthogonal DRS.

11. A non-transitory computer-readable medium having computer-executable instructions embodied thereon to execute the method of claim 8.

\* \* \* \* \*